US012692725B2

(12) United States Patent
Holtgrewe et al.

(10) Patent No.: US 12,692,725 B2
(45) Date of Patent: Jul. 28, 2026

(54) EXIT DEVICE TRIM LOCKING

(71) Applicant: Schlage Lock Company LLC, Carmel, IN (US)

(72) Inventors: Zachary Holtgrewe, Indianapolis, IN (US); Brian C. Eickhoff, Danville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 501 days.

(21) Appl. No.: 17/888,864

(22) Filed: Aug. 16, 2022

(65) Prior Publication Data

US 2022/0396974 A1 Dec. 15, 2022

Related U.S. Application Data

(63) Continuation of application No. 16/826,943, filed on Mar. 23, 2020, now Pat. No. 11,414,892.

(Continued)

(51) Int. Cl.
*E05B 65/10* (2006.01)
*E05B 47/02* (2006.01)

(Continued)

(52) U.S. Cl.
CPC ........ *E05B 65/1046* (2013.01); *E05B 47/023* (2013.01); *E05B 63/143* (2013.01); *E05B 47/0012* (2013.01); *E05B 63/04* (2013.01)

(58) Field of Classification Search
CPC .... E05B 65/1046; E05B 63/143; E05B 63/04; E05B 47/023; E05B 47/0012

(Continued)

(56) References Cited

U.S. PATENT DOCUMENTS 6,938,445 B2 9/2005 Huang
7,634,927 B1 * 12/2009 Tien ...................... E05B 13/004 70/DIG. 60

(Continued)

FOREIGN PATENT DOCUMENTS

DE 102011053348 A1 3/2013
WO 2019018901 A1 1/2019

OTHER PUBLICATIONS

Canadian Examination Report; Canadian Intellectual Property Office; Canadian Application No. 3,160,742; Aug. 31, 2023; 3 pages.

(Continued)

*Primary Examiner* — Kristina R Fulton
*Assistant Examiner* — James Edward Ignaczewski
(74) *Attorney, Agent, or Firm* — Taft Stettinius & Hollister LLP

(57) ABSTRACT

An exemplary trim lock device is configured for use with a trim comprising a lift finger, and generally includes a housing, a blocking member, and a lock actuator. The blocking member includes a projection, and is rotatably mounted to the housing for rotation between a blocking position in which the projection blocks actuating movement of the lift finger and an unblocking position in which the blocking member does not block actuating movement of the lift finger. The lock actuator is operable to rotate the blocking member between the blocking position and the unblocking position.

36 Claims, 14 Drawing Sheets

Related U.S. Application Data

(60) Provisional application No. 62/942,854, filed on Dec. 3, 2019.

(51) Int. Cl.
*E05B 63/14* (2006.01)
*E05B 47/00* (2006.01)
*E05B 63/04* (2006.01)

(58) Field of Classification Search
USPC ............................................................ 292/92
See application file for complete search history.

(56) References Cited

U.S. PATENT DOCUMENTS

| | | | |
|---|---|---|---|
| 8,011,702 | B2 | 9/2011 | Tien et al. |
| 8,267,422 | B2 * | 9/2012 | Sauer .................. B60R 21/2035 280/731 |
| 9,140,032 | B2 * | 9/2015 | Lin ..................... E05B 17/0066 |
| 9,187,928 | B2 | 11/2015 | Abel et al. |
| 9,273,495 | B2 | 3/2016 | Tien |
| 9,435,141 | B2 | 9/2016 | Tien |
| 9,435,142 | B2 | 9/2016 | Carpenter et al. |
| 9,567,773 | B2 | 2/2017 | Dore Vasudevan et al. |
| 9,945,158 | B2 | 4/2018 | Lehner, Jr. et al. |
| 2012/0175892 | A1 * | 7/2012 | Shen ................... E05B 47/0673 292/92 |
| 2015/0167354 | A1 * | 6/2015 | Tien .......................... E05B 9/08 292/92 |
| 2015/0184425 | A1 | 7/2015 | Ellis et al. |
| 2016/0017641 | A1 | 1/2016 | Lin |
| 2016/0069107 | A1 | 3/2016 | Uyeda et al. |
| 2016/0230423 | A1 | 8/2016 | Lehner, Jr. et al. |
| 2018/0245375 | A1 * | 8/2018 | Arlinghaus ............. E05B 17/22 |
| 2019/0093393 | A1 | 3/2019 | Ginter et al. |
| 2019/0309543 | A1 | 10/2019 | Griswold et al. |
| 2019/0368226 | A1 | 12/2019 | Sweeney et al. |
| 2020/0248480 | A1 * | 8/2020 | Arlinghaus ......... E05B 47/0669 |
| 2020/0408002 | A1 * | 12/2020 | Woodley ............. E05B 65/1086 |
| 2021/0164267 | A1 | 6/2021 | Holtgrewe et al. |

OTHER PUBLICATIONS

International Search Report; International Searching Authority; International Application No. PCT/US2020/063082; Jul. 13, 2021; 4 pages.

Written Opinion; International Searching Authority; International Application No. PCT/US2020/063082; Jul. 13, 2021; 10 pages.

* cited by examiner

EXIT DEVICE TRIM LOCKING

CROSS REFERENCE TO RELATED APPLICATIONS

The present application is a continuation of U.S. patent application Ser. No. 16/826,943 filed Mar. 23, 2020 and issued as U.S. Pat. No. 11,414,892, which claims the benefit of U.S. Provisional Patent Application No. 62/942,854 filed Dec. 3, 2019, the contents of each application are incorporated by reference in their entirety.

TECHNICAL FIELD

The present disclosure generally relates to exit device assemblies, and more particularly but not exclusively relates to systems and methods for locking and/or unlocking an exterior trim and/or an electrified door lock mechanism of such exit device assemblies.

BACKGROUND

Exit devices are commonly installed on doors to provide for egress from an area. Such exit devices typically have a latchbolt that is actuated by a pushbar of the exit device to enable opening of the door from the egress side of the door. Occasionally, such exit devices will further include an exterior trim that is installed to the non-egress side of the door to permit for retraction of the latchbolt from the exterior of the access-controlled area. In certain situations, such as emergency lockdowns, it may be desirable to lock the exterior trim to prevent users outside the access-controlled area from entering the area.

While certain conventional exit devices include mechanisms that operate to lock the outside trim, these mechanisms typically must be actuated from the exterior side of the door and/or do not provide an indication on the interior side of the door that the trim is locked. As such, a user will typically need to open the door and view or manipulate the exterior trim in order to ascertain whether the trim is in fact locked. As will be appreciated, such opening of the door may expose the user to hazardous conditions, particularly in emergency situations. For these reasons among others, there remains a need for further improvements in this technological field.

SUMMARY

An exemplary trim lock device is configured for use with a trim comprising a lift finger, and generally includes a housing, a blocking member, and a lock actuator. The blocking member includes a projection, and is rotatably mounted to the housing for rotation between a blocking position in which the projection blocks actuating movement of the lift finger and an unblocking position in which the blocking member does not block actuating movement of the lift finger. The lock actuator is operable to rotate the blocking member between the blocking position and the unblocking position. Further embodiments, forms, features, and aspects of the present application shall become apparent from the description and figures provided herewith

DETAILED DESCRIPTION OF ILLUSTRATIVE EMBODIMENTS

Figure 2:
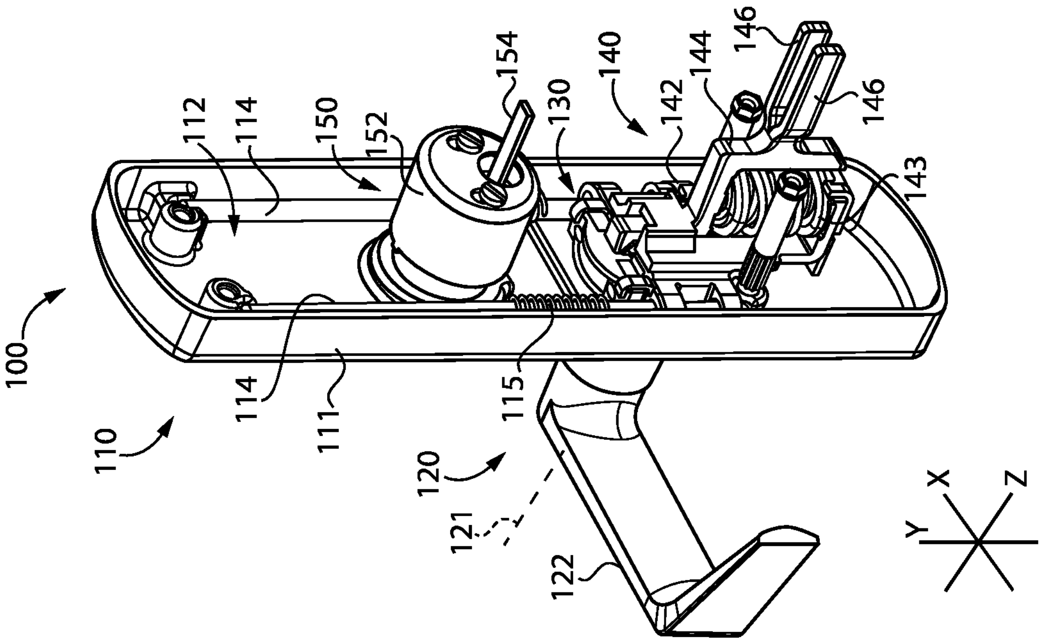
FIG. 2 is a perspective illustration of a trim assembly that may be used in the exit device assembly illustrated in FIG. 1.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 2, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
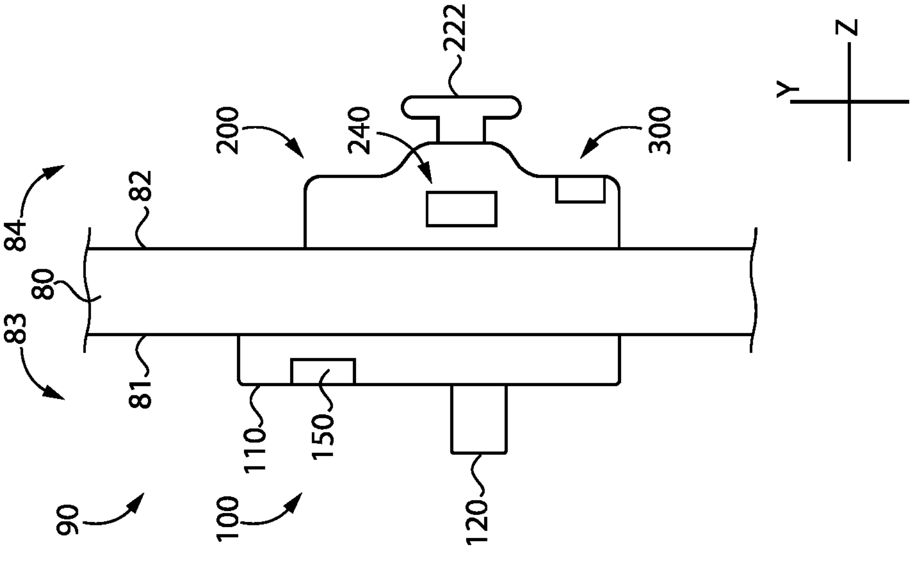
FIG. 1 is a schematic representation of a door having installed thereon an exit device assembly according to certain embodiments.

With reference to FIG. 1, illustrated therein is a door 80 having installed thereon an exit device assembly 90 according to certain embodiments. The door 80 generally includes a non-egress side 81 and an egress side 82 opposite the non-egress side 81. When the door 80 is in its closed position, the non-egress side 81 faces an exterior or outer region 83, and the egress side 82 faces an interior or access-controlled region 84. The exit device assembly 90 generally includes a trim 100 installed to the non-egress side 81, a pushbar assembly 200 installed to the egress side 82, and a trim lock device 300 installed to the egress side 82. As described herein, the pushbar assembly 200 includes a latch mechanism 240 and a pushbar 222 operable to actuate the latch mechanism 240, and the trim 100 is selectively operable to actuate the latch mechanism 240 based upon the locked/unlocked state of the trim lock device 300, which selectively prevents the trim 100 from actuating the latch mechanism 240.

With additional reference to FIG. 2, the trim 100 generally includes an escutcheon 110, a manual actuator 120 rotatably mounted to the escutcheon 110, a cam 130 engaged with the manual actuator 120, and a lift finger assembly 140 engaged with the manual actuator 120 via the cam 130 such that rotation of the manual actuator 120 lifts or causes vertical displacement of the lift finger assembly 140. In certain embodiments, the trim 100 may further include a lock cylinder assembly 150. As described herein, the lift finger assembly 140 extends through the door 80 and is engaged with the pushbar assembly 200 such that rotation of the manual actuator 120 selectively actuates the latch mechanism 240.

The escutcheon 110 is mounted to the non-egress side 81 of the door 80, and includes a housing 111 defining a chamber 112 in which various working components of the trim 100 are seated. The escutcheon 110 further includes a pair of laterally-extending rods 114 on which the lift finger assembly 140 is slidably mounted for movement between a deactuated position and an actuated position. While other forms are contemplated, in the illustrated embodiment, the deactuated position is a vertically lower position and the actuated position is a vertically upper position such that the lift finger assembly 140 is lifted from its deactuated position to its actuated position. The escutcheon 110 may further include and a biasing member 115 urging the lift finger assembly 140 toward its deactuated position. In the illustrated form, the biasing member 115 is provided in the form of one or more compression springs. In other embodiments, the biasing member 115 may include additional or alternative biasing features, such as one or more torsion springs, extension springs, elastic members, and/or magnets.

The manual actuator 120 is pivotably mounted to the escutcheon 110, and is operable to laterally drive the lift finger assembly 140 between its deactuated position and its actuated position. In the illustrated form, the manual actuator 120 is rotatable about a transverse axis 121, and is operably connected with the cam 130 such that rotation of the manual actuator 120 causes a corresponding rotation of the cam 130. While the illustrated manual actuator 120 is provided in the form of a lever 122 that rotates about the transverse axis 121 in order to lift the lift finger assembly 140, it is to be appreciated that other forms are contemplated. For example, in certain embodiments, the manual actuator 120 may be provided as a knob that rotates about the transverse axis 121 in order to lift the lift finger assembly 140. In other forms, the manual actuator 120 may be provided in the form of a thumb lever that pivots about a longitudinal axis in order to lift the lift finger assembly 140.

Such a thumb lever may be engaged with the lift finger assembly 140 via a cam such as the cam 130, or via other mechanisms.

The cam 130 is rotatably mounted to the escutcheon 110, and is engaged between the manual actuator 120 and the lift finger assembly 140 such that actuation of the manual actuator 120 drives the lift finger assembly 140 from its deactuated position to its actuated position against the biasing force of the biasing member 115.

The lift finger assembly 140 generally includes a driving piece 142 engaged with the cam 130, and a driven piece or lift finger 144 engaged with the driving piece 142 via one or more springs 143. The driven piece 144 includes at least one finger 146, and in the illustrated form includes a pair of fingers 146 that extend generally parallel to one another. As described herein, the driven piece 144 extends through the door 80 such that the finger(s) 146 engage the pushbar assembly 200 and the trim lock device 300. Rotation of the cam 130 drives the driving piece 142 upward against the force of the biasing member 115, and the upward motion of the driving piece 142 is transmitted to the driven piece 144 via the one or more springs 143. In the event that the driven piece 144 is prevented from such upward movement, the springs 143 may compress to permit continued motion of the driving piece 142, thereby enabling at least some movement of the manual actuator 120. As described herein, the finger 146 is engaged with the pushbar assembly 200 and the trim lock device 300 such that movement of the lift finger assembly 140 in an actuating direction (e.g., by the manual actuator 120) actuates the latch mechanism 240.

The lock cylinder assembly 150 is mounted to the escutcheon 110, and generally includes a lock cylinder 152 and a tailpiece 154 engaged with the lock cylinder 152. As is typical of lock cylinders, the lock cylinder 152 includes a shell, a plug rotatably mounted in the shell, and a tumbler system operable to selectively prevent rotation of the plug relative to the shell. The tailpiece 154 is engaged with the plug such that, upon insertion of a proper key, the key can be rotated to rotate the plug, thereby rotating the tailpiece 154. Such rotation may, for example, actuate a latch control assembly 230 of the pushbar assembly 200 to actuate the latch mechanism 240 in a manner typical of trim-mounted lock cylinders.

Figure 3:
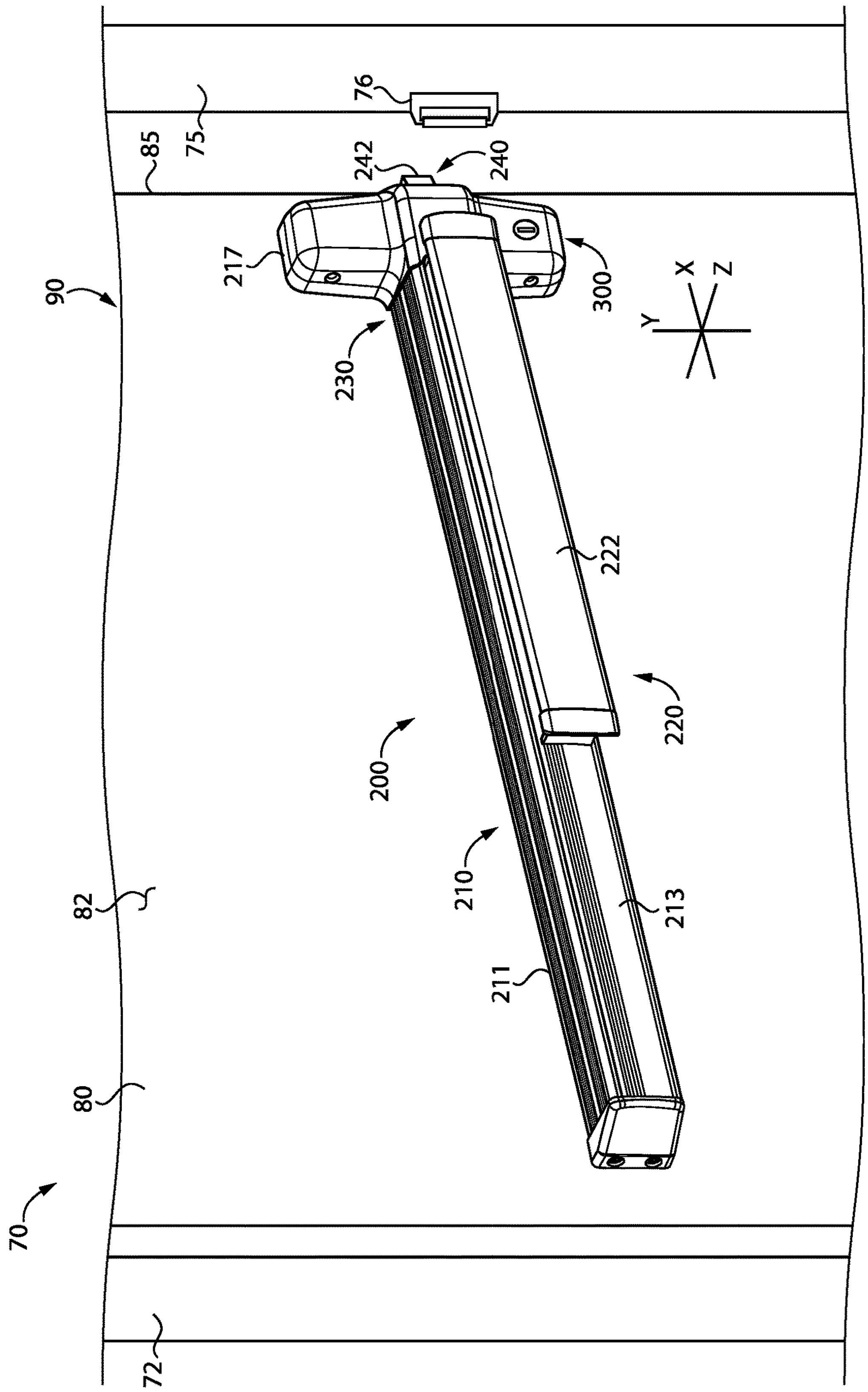
FIG. 3 is a perspective illustration of a pushbar assembly that may be used in the exit device assembly illustrated in FIG. 1.

With additional reference to FIG. 3, illustrated therein are certain features of a closure assembly 70 that generally includes the door 80 and the exit device assembly 90. The closure assembly 70 further includes a doorframe 72 on which the door 80 is swingingly mounted. The doorframe 72 includes a latch jamb 75 that is adjacent a free edge 85 of the door 80 when the door 80 is in its closed position. In the illustrated form, the closure assembly 70 further includes a strike 76, which is mounted to the latch jamb 75 and is operable to engage the latch mechanism 240 to selectively retain the door 80 in its closed position.

Figure 4:
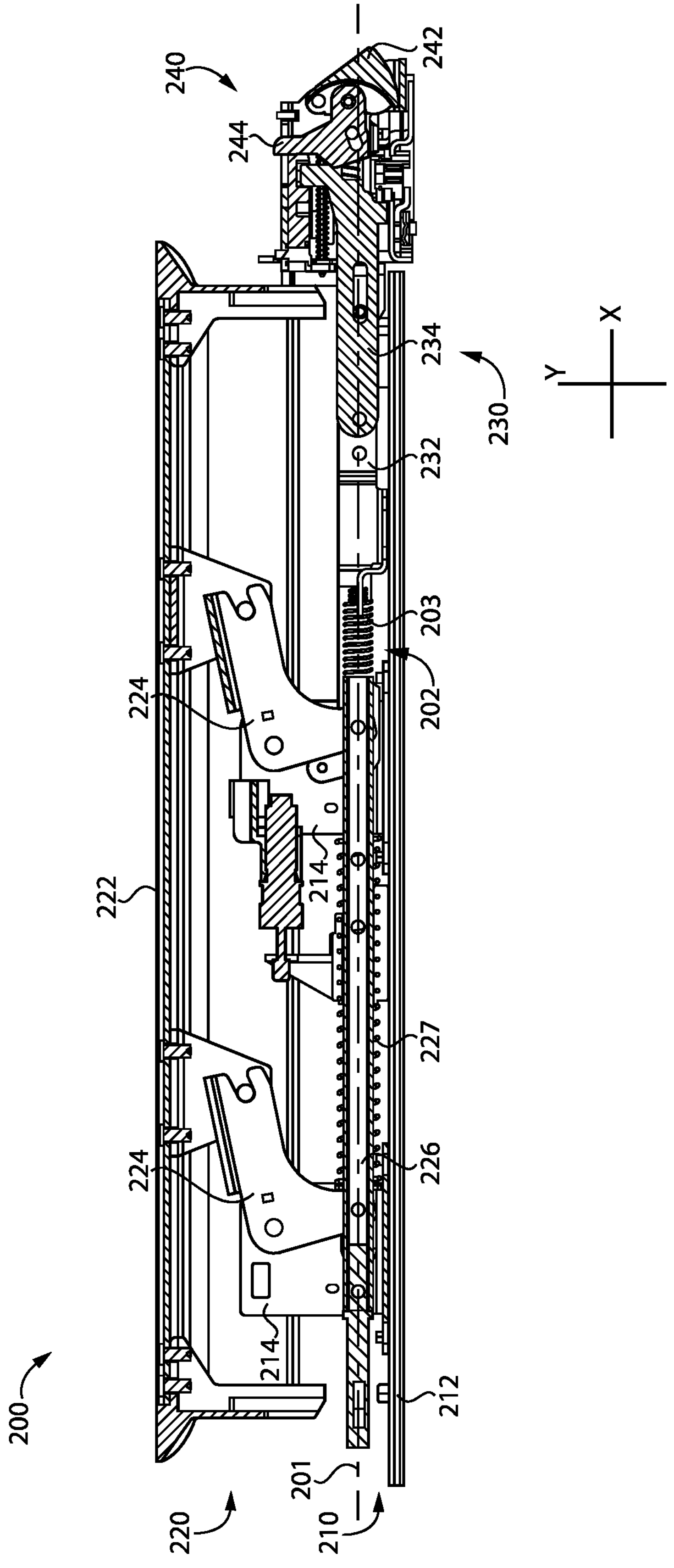
FIG. 4 is a cross-sectional illustration of the pushbar assembly illustrated in FIG. 3.

With additional reference to FIG. 4, the pushbar assembly 200 generally includes a mounting assembly 210, a drive assembly 220 movably mounted to the mounting assembly 210, and a latch control assembly 230 operably coupled with the drive assembly 220, and in the illustrated form, further includes the latch mechanism 240 and the trim lock device 300.

The mounting assembly 210 generally includes a longitudinally-extending channel member 211, a mounting plate 212 mounted in the channel member 211, a cover plate 213 enclosing a distal end portion of the channel member 211, a pair of bell crank mounting brackets 214 extending transversely from the mounting plate 212, a header plate 216 positioned adjacent a proximal end of the mounting plate 212, and a header case 217 mounted to the header plate 216. As illustrated in FIG. 4, the channel member 211 extends along a longitudinal axis 201 of the pushbar assembly 200.

The drive assembly 220 generally includes a transversely-movable pushbar 222, a pair of bell cranks 224 connecting the pushbar 222 with a longitudinally-movable drive rod 226, and a main spring 227 urging the drive assembly 220 toward a deactuated state. The pushbar 222 is mounted for transverse movement between a projected position and a depressed position to transition the drive assembly 220 between a deactuated state in which the pushbar 222 is in its projected position and an actuated state in which the pushbar 222 is in its depressed position. The bell cranks 224 are mounted to the bell crank brackets 214, and correlate the transverse movement of the pushbar 222 with longitudinal movement of the drive rod 226. More particularly, the bell cranks 224 cause the drive rod 226 to move between a proximal position (to the right in FIG. 4) and a distal position (to the left in FIG. 4) such that the proximal position is correlated with the projected or deactuated position of the pushbar 222 and the distal position is correlated with the depressed or actuated position of the pushbar 222. Additionally, the main spring 227 is engaged between the drive rod 226 and the mounting assembly 210 such that the main spring 227 urges the drive rod 226 toward its proximal position, thereby biasing the drive assembly 220 toward its deactuated state.

The drive assembly 220 is connected with the latch control assembly 230 via a lost motion connection 202 that causes actuation of the latch control assembly 230 in response to actuation of the drive assembly 220, and which permits the drive assembly 220 to remain in its deactuated state when the latch control assembly 230 is actuated by another mechanism (e.g., the trim 100). As a result, the drive assembly 220 is operable to actuate the latch control assembly 230. The lost motion connection 202 may include a biasing member such as a spring 203 urging the latch control assembly 230 toward a deactuated state thereof.

The latch control assembly 230 generally includes a control link 232 connected with the drive rod 226 via the lost motion connection 202, a yoke 234 connected with the control link 232 for joint movement along the longitudinal axis 201, a pair of drivers 236 mounted to the header plate 316 for lateral movement, and a pair of pivot cranks 238 operably coupling the drivers 236 with the yoke 234. The control link 232 is connected with the drive assembly 220 such that actuation of the drive assembly 220 longitudinally drives the control link 232 and the yoke 234 between a proximal deactuated position and a distal actuated position. The drivers 236 are mounted for lateral movement between a laterally-outward deactuated position and a laterally-inward actuated position, and the pivot cranks 238 correlate longitudinal movement of the control link 232 and yoke 234 with lateral movement of the drivers 236.

As used herein, the terms "laterally inward" and "laterally outward" may be used to denote positions and/or motion relative to the longitudinal axis 201. For example, a laterally inward position is one nearer the longitudinal axis 201, and a laterally outward position is one farther from the longitudinal axis 201. Thus, while the laterally inward and laterally outward positions for the upper driver 236 are respectively provided as a lower position and an upper position, the laterally inward and laterally outward positions for the lower driver 236 are respectively provided as an upper position and a lower position. Similarly, laterally inward movement is movement toward the longitudinal axis 201, while laterally outward movement is movement away from the longitudinal axis 201. Thus, laterally inward movement for the upper driver 236 is downward movement, while laterally outward movement for the upper driver 236 is upward movement. Conversely, laterally inward movement for the lower driver 236 is upward movement, while laterally outward movement for the lower driver 236 is downward movement.

As noted above, the pivot cranks 238 correlate longitudinal movement of the control link 232 and the yoke 234 with lateral movement of the drivers 236. More particularly, the pivot cranks 238 correlate distal movement of the control link 232 and the yoke 234 with laterally inward or actuating movement of the drivers 236, and correlate proximal movement of the control link 232 and the yoke 234 with laterally outward or deactuating movement of the drivers 236. The latch control assembly 230 has an actuating state in which each component thereof is in a corresponding and respective actuating position, and a deactuating state in which each component thereof is in a corresponding and respective deactuating position. For the control link 232 and the yoke 234, the actuating position is a distal position, and the deactuating position is a proximal position. For the drivers 236, the actuating position is a laterally inward position, and the deactuating position is a laterally outward position.

The latch mechanism 240 is operably connected with the latch control assembly 230 such that actuating movement of the latch control assembly 230 causes a corresponding actuation of the latch mechanism 240. In the illustrated form, the latch mechanism 240 generally includes a latchbolt 242 and a retractor 244 connecting the latchbolt 242 with the yoke 234 such that distal actuating movement of the yoke 234 drives the latchbolt 242 from an extended position to a retracted position. As described herein, such actuating movement may be imparted to the latch control assembly 230 by the drive assembly 220, and may also be imparted to the latch control assembly 230 by the trim 100.

In the illustrated form, the latch mechanism 240 is installed in the header case 117, and engages the strike 75 when the door 80 is closed and the pushbar assembly 200 is deactuated. It is also contemplated that the exit device assembly 90 may include latch mechanisms in additional or alternative locations. As one example, the exit device assembly 90 may be provided as a vertical exit device assembly including an upper latch mechanism and/or a lower latch mechanism. In such a vertical exit device, the upper latch mechanism may be installed above the pushbar assembly 200 (e.g., adjacent the top edge of the door 80) and connected to the upper driver 236 via an upper connector (e.g., a rod or cable). Additionally or alternatively, a lower latch mechanism may be installed below the pushbar assembly (e.g., adjacent the bottom edge of the door 80) and connected to the lower driver 236 via a lower connector (e.g., a rod or cable). In certain forms, a vertical exit device may be provided as a concealed vertical exit device, in which the connectors run through channels formed within the door 80. In other embodiments, a vertical exit device may be provided as a surface vertical exit device, in which the connectors are mounted to the egress side 82 of the door 80. An example of a vertical exit device assembly is described below with reference to FIG. 9.

Furthermore, while the illustrated latch mechanism 240 directly drives a latchbolt 242 between an extended position and a retracted position during actuation and deactuation of the latch mechanism 240, other forms of actuation are also contemplated for the latch mechanism 240. As one example, actuation of the latch mechanism may drive a blocking member from a blocking position to an unblocking position to permit retraction of a bolt without directly driving the bolt to the retracted position. In such forms, deactuation of the latch mechanism may tend to return the blocking member to the blocking position such that, when the bolt returns to its extended position, the blocking member once again retains the bolt in that extended position.

Figure 6:
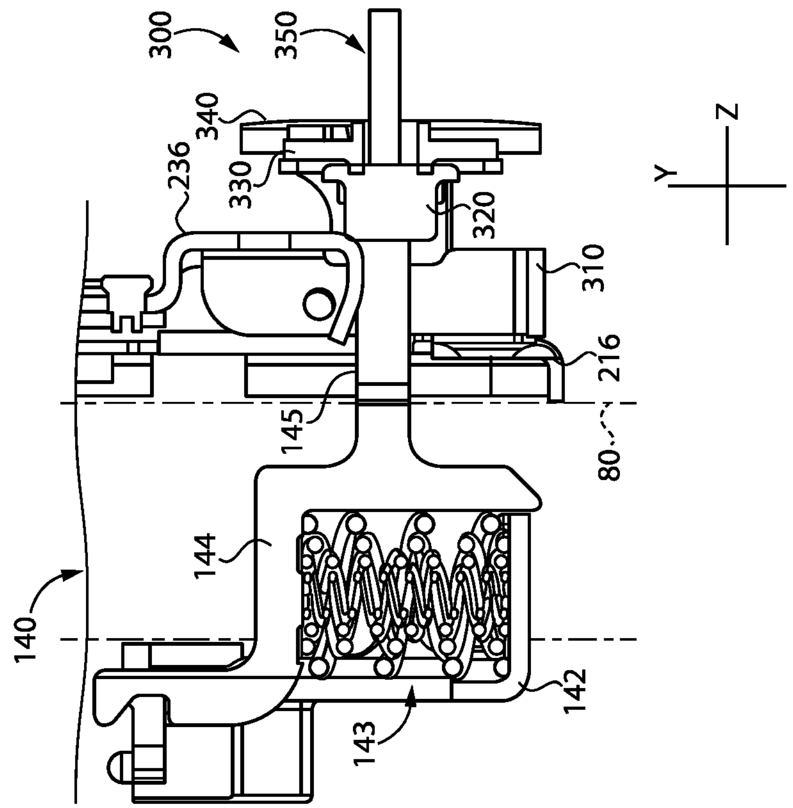
FIG. 6 is a cross-section of a portion of the exit device assembly illustrated in FIG. 1.
Figure 5:
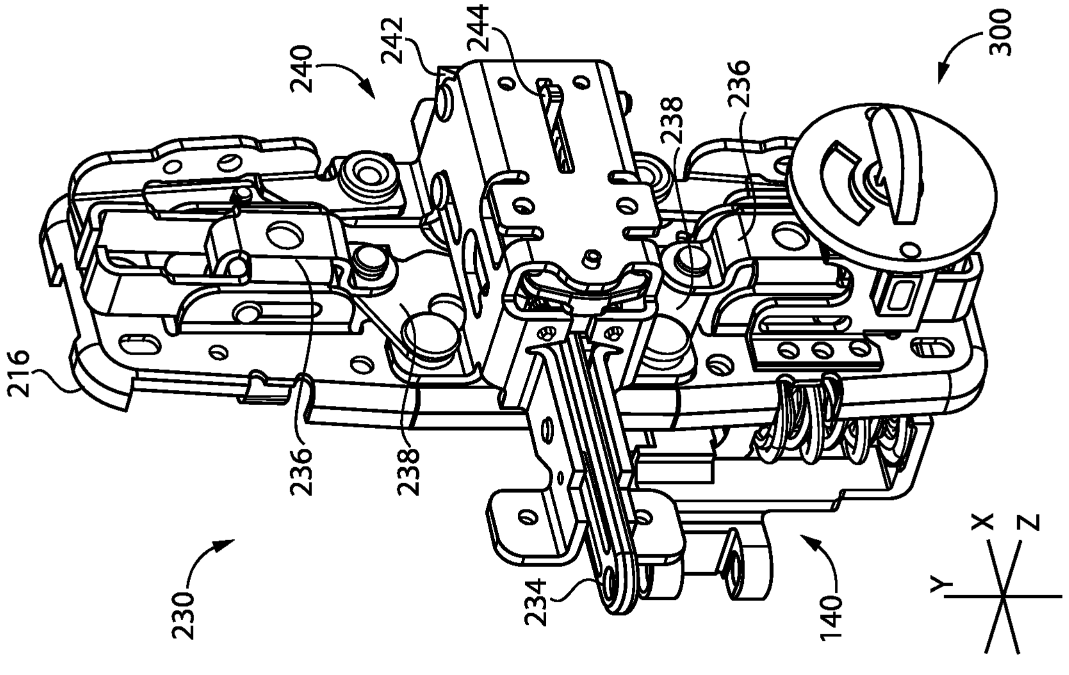
FIG. 5 is a perspective view of a portion of the pushbar assembly illustrated in FIG. 3.

With additional reference to FIG. 6, the driven piece 144 of the lift finger assembly 140 extends through the door 80 such that the fingers 146 engage the lower surface of the lower driver 236. As a result, upward movement of the driven piece 144 (e.g., in response to actuation of the manual actuator 120) drives the lower driver 236 upward, which is the laterally inward or actuating direction for the lower driver 236. Thus, actuation of the manual actuator 120 is operable to drive the latch control assembly 230 toward its actuating state, and to thereby cause actuation of the latch mechanism 240. The driven piece 144 may be engaged with the lower driver 236 via a one-way push connection such that actuation of the latch control assembly 230 (e.g., by the drive assembly 220) does not cause a corresponding upward movement of the lift finger assembly 140, thereby permitting the trim 100 to remain unactuated during actuation of the pushbar assembly 200.

While an illustrative form of the pushbar assembly 200 has been illustrated and described, it should be appreciated that pushbar assemblies of other types may be utilized. Such pushbar assemblies will generally include a pushbar and a latch control assembly that is operably connected with the pushbar such that movement of the pushbar between a projected position and a depressed position drives the latch control assembly between a deactuated state and an actuated state. In certain embodiments, the pushbar assembly may further include a latch mechanism operably connected with the latch control assembly such that actuation of the latch control assembly causes a corresponding actuation of the latch mechanism. In certain embodiments, the latch mechanism may be omitted from the pushbar assembly, and may instead be provided as a remote latch mechanism that is offset from the pushbar assembly, for example in a vertical direction.

Figure 7:
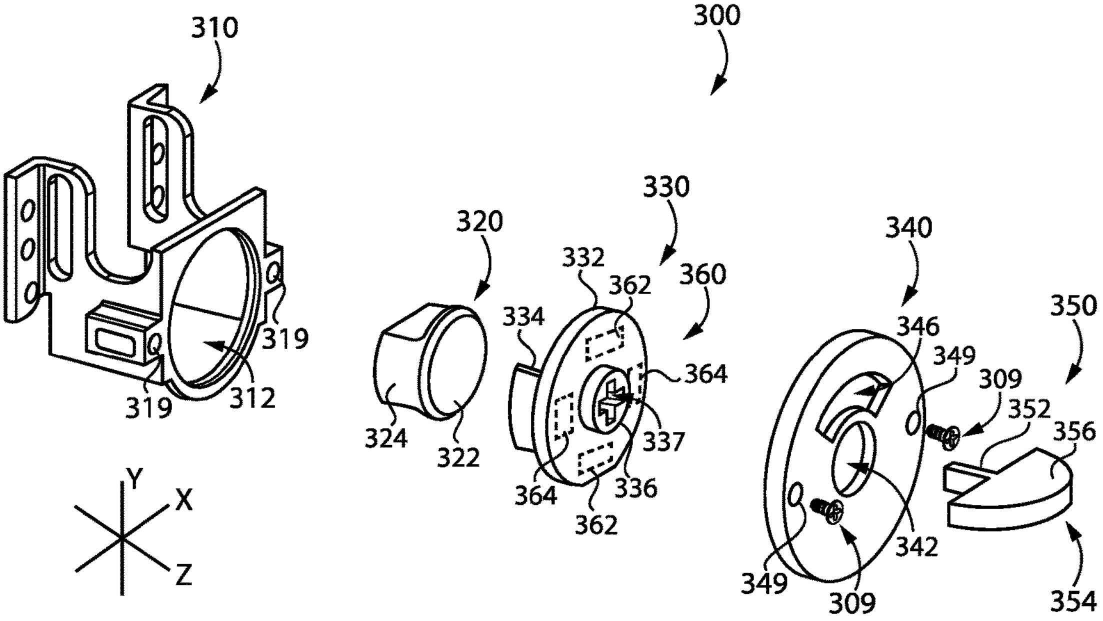
FIGS. 7 and 8 is are exploded assembly views of a trim lock device according to certain embodiments.
Figure 8:
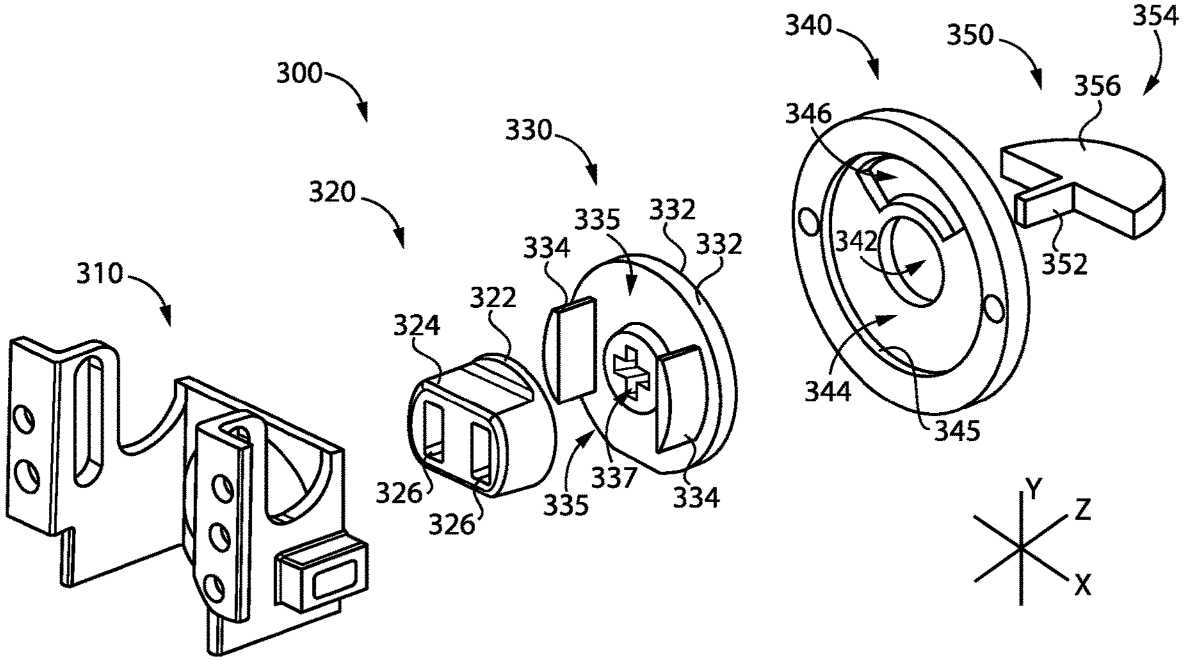

With additional reference to FIGS. 7 and 8, the trim lock device 300 generally includes a housing 310 mounted to the header plate 216, an adapter 320 coupled with the driven piece 142, a blocking member 330 operable to selectively prevent lateral movement of the adapter 320, a cover 340 coupled to the housing 310 and/or the header case 217, and a lock actuator 350 operable to move the blocking member 330 between a blocking position and an unblocking position, and may further include an indicator 360 configured to indicate the locked/unlocked state of the trim lock device 300.

The housing 310 is mounted to the header plate 216, and provides a mounting location for certain other components of the trim lock device 300. The housing 310 includes a circular opening 312 in which the blocking member 330 is rotatably seated. As a result, the housing 310 prevents radial movement of the blocking member 330, including lateral movement.

The adapter 320 is mounted to the driven piece 144 for joint lateral movement therewith. The illustrated adapter 320 includes a base portion 322, an extension 324 extending from the base portion 322, and a pair of apertures 326 formed in the extension 324. Tips of the fingers 146 extend into the apertures 326 such that the adapter 320 is carried by the driven piece 144 as the driven piece 144 moves between its upper actuating position and its lower deactuating position.

The blocking member 330 includes a base plate 332 and a pair of projections 334 extending from the rear side of the base plate 332 such that a pair of gaps 335 are defined between opposite ends of the projections 334. The blocking member 330 has a blocking position defining a locked or secured state of the trim lock device 300 and an unblocking position defining an unlocked or unsecured state of the trim lock device 300. In the blocking position, one of the projections 334 is positioned above the adapter 320 and prevents upward movement of the adapter 320, thereby preventing the driven piece 144 from actuating the lower driver 236. In the unblocking position, the projections 334 are positioned on opposite longitudinal sides of the adapter 320 such that the blocking member 330 does not prevent upward movement of the adapter 320, thereby permitting actuation of the driver 236 by the driven piece 144. The blocking member 330 further includes a circular post 336 that extends beyond the front face of the base plate 332, and which includes an opening 337 operable to receive a portion of the lock actuator 350. In certain embodiments, the front side of the base plate 332 may include or otherwise define the indicator 360.

The blocking member 330 has at least one blocking position and at least one unblocking position. In the illustrated embodiment, the blocking member 330 has two blocking positions and two unblocking positions. More particularly, a first blocking position is defined when a first of the projections 334 is positioned above the adapter 320, and a second blocking position is defined when the other of the projections 334 is positioned above the adapter 320. Similarly, a first unblocking position is defined when a first of the gaps 335 is positioned above the adapter 320, and a second blocking position is defined when the other of the gaps 335 is positioned above the adapter 320. It is also contemplated that the blocking member 330 may have more or fewer blocking positions and/or more or fewer unblocking positions.

The cover 340 aids in enclosing the trim lock device 300 within the header case 217, and in the illustrated form facilitates viewing of a portion of the indicator 360. The illustrated cover 340 includes a circular opening 342 in which the circular post 336 is received such that the blocking member 330 is rotatably supported by the cover 340, and further includes a viewing window 346 through which a portion of the indicator 360 is visible. The rear side of the cover 340 may define a recess 344, the rim 345 of which may engage the rim 333 of the base plate 332 to provide further rotational support for the blocking member 330. The cover 340 may, for example, be secured to the housing 310 via one or more fasteners 309 (e.g., rivets or screws) that extend into openings 319 of the housing via openings 349 in the cover 340.

The lock actuator 350 is at least selectively engaged with the blocking member 330, and facilitates rotation of the blocking member 330 between its blocking position and its unblocking position. The lock actuator 350 includes a tailpiece 352 configured to be received in the opening 337 of the blocking member 330 to rotationally couple the blocking member 330 with at least a portion of the lock actuator 350. In the illustrated embodiment, the lock actuator 350 is provided in the form of a mechanical actuator, and more particularly in the form of a thumbturn 354 that includes a grip portion 356 from which the tailpiece 352 extends. The thumbturn 354 is engaged with the blocking member 330 such that rotation of the thumbturn 354 causes a corresponding rotation of the blocking member 330. In certain embodiments, the thumbturn 354 may be securely mounted to the blocking member 330 such that manual actuation of the blocking member 330 is facilitated at all times. In other embodiments, the thumbturn 354 may be removably mounted to the blocking member 330 such that a user carrying the thumbturn 354 may insert the tailpiece 352 into the opening 337 to facilitate manual rotation of the blocking member 330.

As noted above, the illustrated lock actuator 350 is provided as a mechanical lock actuator, and more particularly in the form of a thumbturn 354. It is also contemplated that the lock actuator 350 may be provided as another form of mechanical lock actuator in which the actuating piece is provided in a form other than that of a thumbturn 354. As one example, the opening 337 in the blocking member 330 may have a hexagonal shape, and the actuating piece of the lock actuator 350 may be provided in the form of an Allen wrench or hex key. As another example, the lock actuator 350 may include a lock cylinder including a shell, a plug rotatably mounted in the shell, and a tumbler system operable to selectively prevent rotation of the plug relative to the shell. In such forms, the tailpiece 352 may be engaged with the plug such that, upon insertion of an actuating piece in the form of a properly coded key, the key can be rotated to rotate the plug, thereby rotating the blocking member 330 between its blocking and unblocking positions.

Furthermore, while the illustrated lock actuator 350 is provided as a mechanical lock actuator, it is also contemplated that the lock actuator 350 may be provided as an electromechanical lock actuator. Such an electromechanical embodiment of the lock actuator 350 may, for example, include a motor having a motor shaft that is engaged with the tailpiece 352 such that the motor is operable to rotate the tailpiece 352 to drive the blocking member 330 between its blocking position and its unblocking position. In certain forms, an electromechanical lock actuator may include a user interface by which the electromechanical lock actuator can be activated. In certain embodiments, such a user interface may be an unsecured user interface (e.g., a push-button) such that any user is able to drive the blocking member 330 between its blocking and unblocking positions. In other embodiments, the user interface may be a secured user interface (e.g., a credential reader) such that only certain users are capable of driving the blocking member 330 between its blocking and unblocking positions.

The indicator 360 is configured to selectively display at least one indicium to provide a visual indication regarding the locked/unlocked state of the trim lock device 300. In the illustrated form, the indicator 360 is positioned on the base plate 332 of the blocking member 330, and includes a pair of unlocked indicia 362 and a pair of locked indicia 364. The pair of unlocked indicia 362 correspond to the two unblocking positions of the blocking member 330 such that when the blocking member 330 is in either of its unblocking positions, one of the unlocked indicia 362 is visible via the viewing window 346. Similarly, the pair of locked indicia 364 correspond to the two blocking positions of the blocking member 330 such that when the blocking member 330 is in either of its blocking positions, one of the locked indicia 364 is visible via the viewing window 346.

At least one of the unlocked indicia 362 or the locked indicia 364 is configured to provide the user with a visual indication regarding the locked/unlocked state of the trim lock device 300. The unlocked indicia 362 and/or the locked indicia 364 may, for example, comprise one or more of text, symbols, colors, or other forms of indicia. By way of example, the unlocked indicia 362 may include a symbol such as an open or unlocked padlock, text such as the word "UNLOCKED" or "UNSECURE," and/or a first color. Similarly, the locked indicia 364 may include a symbol such as a closed or locked padlock, text such as the word "LOCKED" or "SECURE," and/or a second color different from the first color.

In the illustrated embodiment, the trim lock device 300 is integrated with the pushbar assembly 200, and may, for example, be provided with the pushbar assembly 200 at the time of sale to an end user. In other embodiments, the trim lock device 300 may be provided in a retrofit kit configured for use with the pushbar assembly 200. Such a retrofit kit may include the trim lock device 300 and a retrofit header case 217 configured to replace the existing header case of the pushbar assembly.

During operation of the exit device assembly 90, the trim lock device 300 may begin in an unlocked state, in which the blocking member 330 is in one of its unblocking positions. In this state, one of the unlocked indicia 362 is aligned with the viewing window 346, thereby indicating to users in the secured region 84 that the trim 100 is unlocked, and that the door 80 is capable of being opened from the exterior region 83. More particularly, a user may operate the manual actuator 120 to drive the lift finger assembly 140 in its actuating direction (upward in the Figures), thereby driving the lower driver 236 in its laterally inward actuating direction and actuating the latch control assembly 230.

In order to transition the exit device assembly 90 to a secured state, the trim lock device 300 may be moved from its unlocked state to its unlocked state. Such movement of the trim lock device 300 may be provided by actuating the lock actuator 350 to rotate the blocking member 330 from its unblocking position to its unblocking position. While other forms are contemplated, in the illustrated embodiment, the blocking member 330 rotates by about 90° between its blocking position and its unblocking position. As the blocking member 330 rotates to its blocking position, the unlocked indicium 362 moves out of alignment with the viewing window 346, and one of the locked indicia 364 becomes aligned with the viewing window 346. Thus, when the trim lock device 300 is in its locked state, one of the locked indicia 364 is visible via the window 346 and indicates to users in the secured region 84 that the trim 100 is locked. In the event that a user attempts to actuate the manual actuator 120, the projection 334 of the blocking member 330 prevents actuating movement of the fingers 146, thereby preventing the manual actuator 120 from actuating the latch control assembly 230 and the latch mechanism 240.

Figure 9:
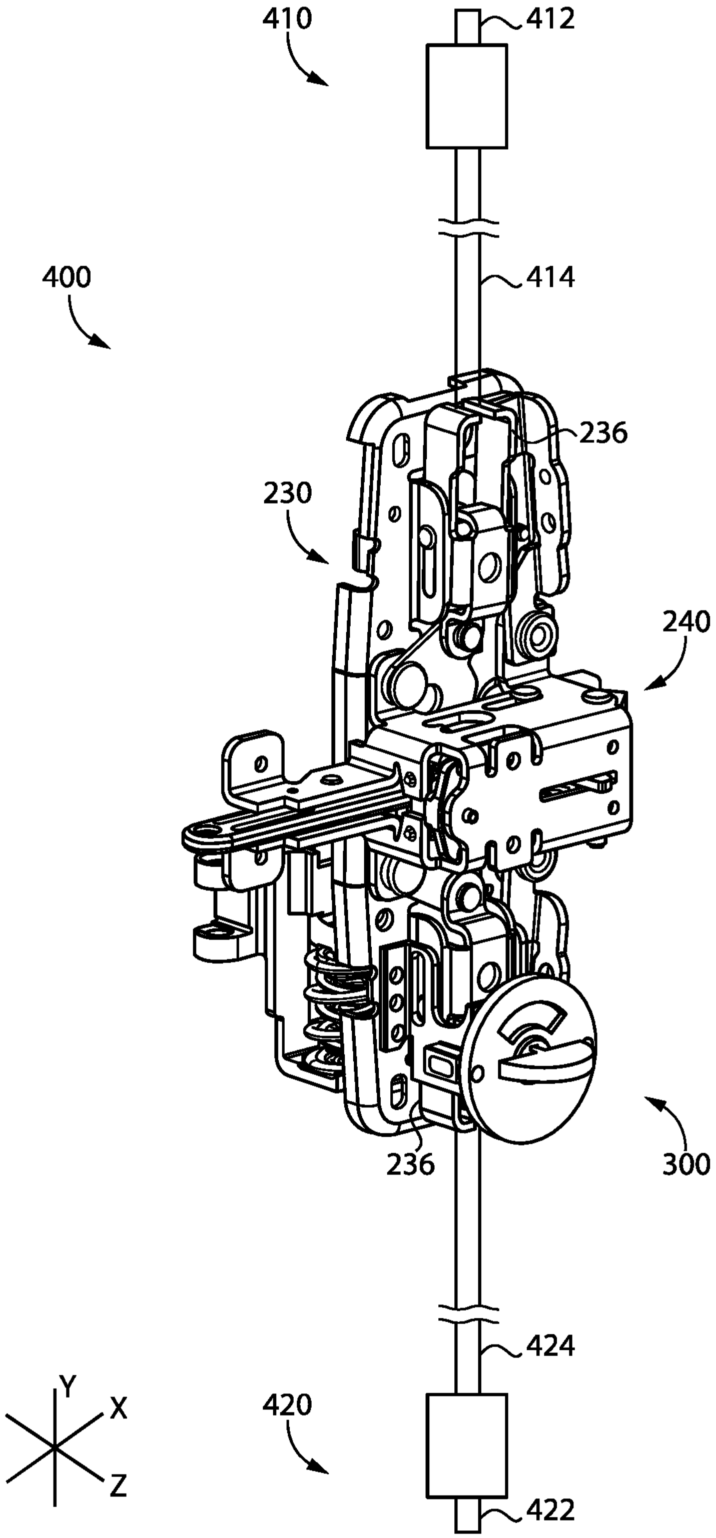
FIG. 9 is a perspective illustration of a portion of an exit device assembly according to certain embodiments.

With additional reference to FIG. 9, illustrated therein is a portion of an exit device assembly 400 according to certain embodiments. The exit device assembly 400 generally includes the trim 100, the pushbar assembly 200, and the trim lock device 300, of which the trim 100 and portions of the pushbar assembly 200 are omitted for clarity. The exit device 400 further includes one or more remote latch mechanisms, each of which is connected to the latch control assembly 230 and includes a latch. An upper latch mechanism 410 includes an upper latch 412, is positioned above the pushbar assembly 200 (e.g., adjacent the top edge of the door 80), and is connected to the upper driver 236 via an upper connector 414. Additionally or alternatively, a lower latch mechanism 420 includes a lower latch 422, is positioned below the pushbar assembly 200 (e.g., adjacent the bottom edge of the door 80), and is connected to the lower driver 236 via a lower connector 424.

In certain embodiments, the exit device assembly 400 may be provided as a concealed vertical exit device assembly, in which the connector(s) 414, 424 extend through channels formed in the door 80. In other embodiments, the exit device assembly 400 may be provided as a surface vertical exit device assembly, in which the connector(s) 414, 424 extend along the egress side 82 of the door. In certain embodiments, the connector(s) 414, 424 may be provided in the form of flexible cables, while in other embodiments, the connector(s) 414, 424 may be provided in the form of rigid rods.

With each of the remote latch mechanisms 410, 420 connected to a corresponding one of the drivers 236, actuation of the latch control assembly 230 causes a corresponding actuation of the remote latch mechanisms 410, 420. Thus, in selectively preventing the actuation of the latch control assembly 230 by the manual actuator 120, the trim lock device 300 is operable to selectively prevent the manual actuator 120 from operating the remote latch mechanisms 410, 420 in a manner analogous to that described above.

Unlike certain prior trim lock mechanisms, the illustrated trim lock mechanism 300 may not necessarily prevent the connection of remote latch mechanisms (e.g., the latch mechanisms 410, 420) with the drivers 236. Thus, while certain prior approaches were limited to providing trim locking functionality in connection with rim-format exit device assemblies (i.e., those in which the bolt mechanism 240 is mounted in the header case 217), the trim lock mechanism 300 described herein is capable of use in other formats of exit device assembly, including vertical exit device assemblies and three-point exit device assemblies.

Figure 10:
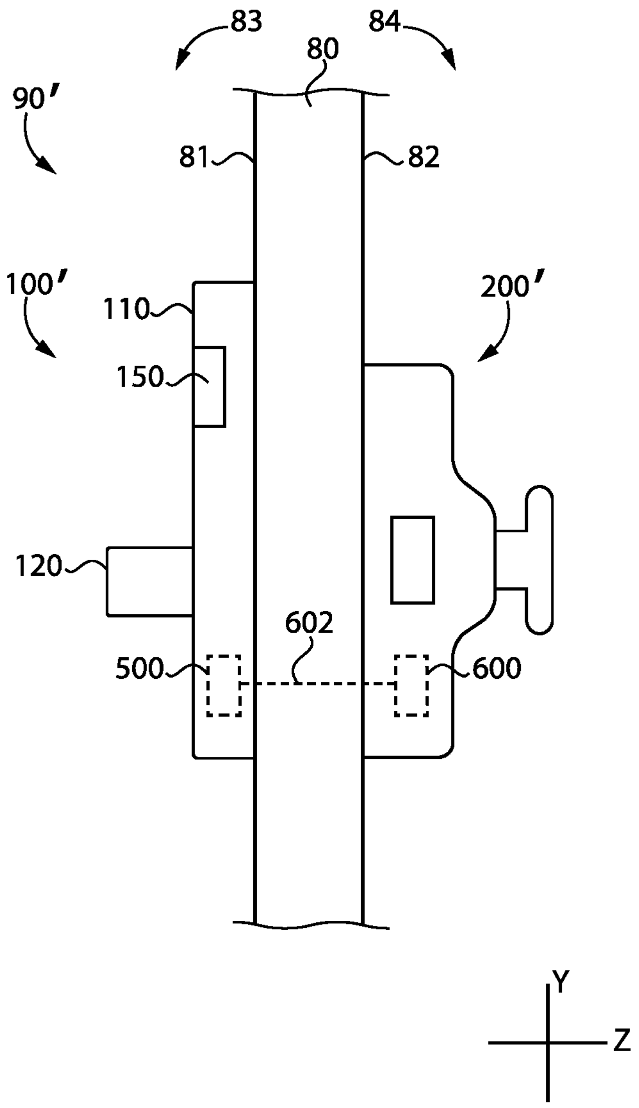
FIG. 10 is a schematic representation of a door having installed thereon an exit device assembly according to certain embodiments.
Figure 11:
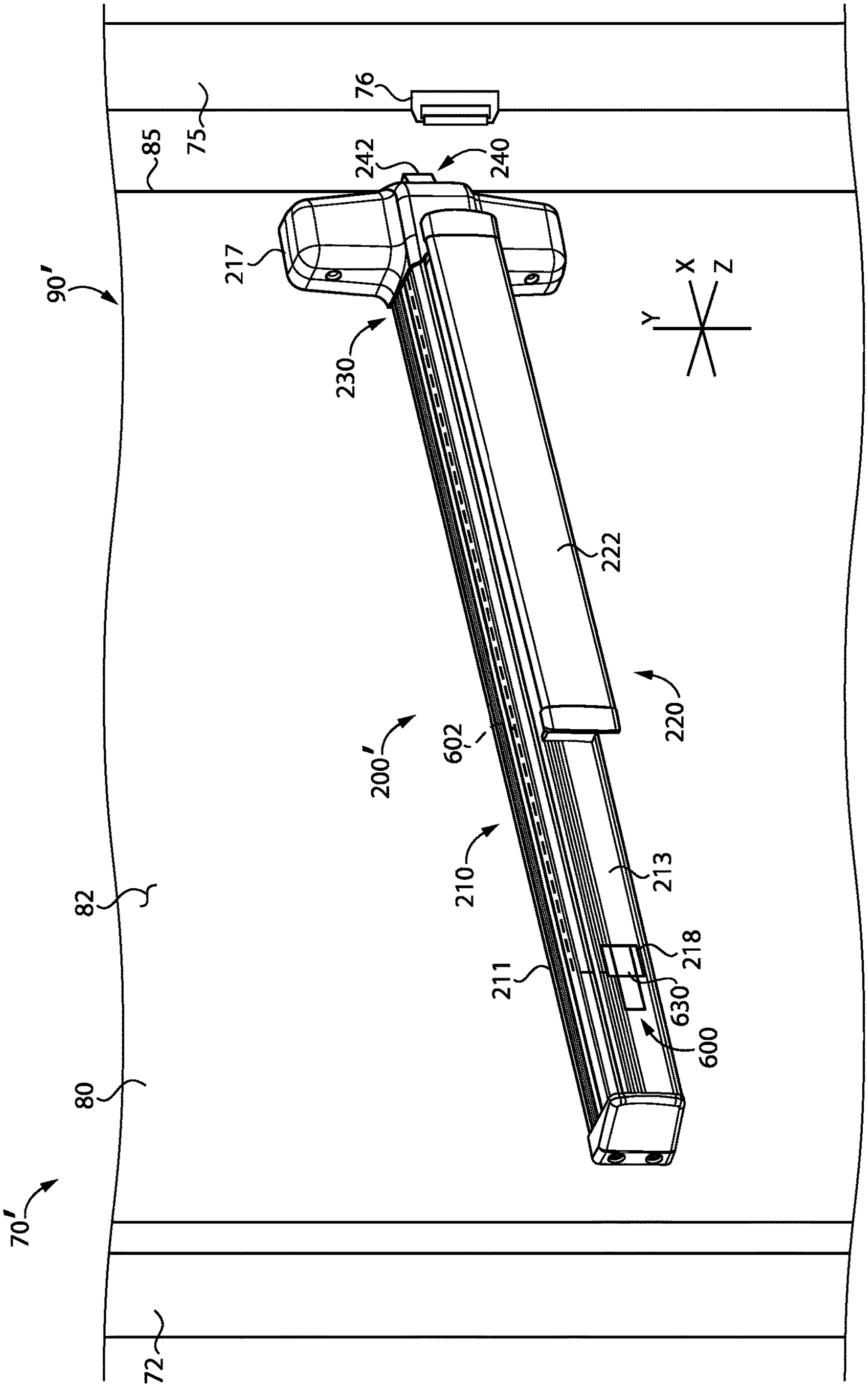
FIG. 11 is a perspective illustration of a pushbar assembly that may be used in the exit device assembly illustrated in FIG. 10.

With additional reference to FIGS. 10 and 11, illustrated therein is an exit device assembly 90' according to certain embodiments mounted to the door 80. The exit device assembly 90' includes an electrified door lock device operable to selectively prevent opening of the door 80 from the non-egress side 81. In the illustrated form, the electrified door lock device is provided in the form of an electrified trim 100'. As described herein, it is also contemplated that the electrified door lock device may be provided in another form, such as that of a magnetic lock, an electric strike, or another form of electrified door lock device.

The exit device assembly 90' is similar to the above-described exit device assembly 90, and includes the electrified trim 100' and a pushbar assembly 200'. The electrified trim 100' is substantially similar to the above-described trim 100, and further includes an electronic lock 500 that is not necessarily included in the above-described trim 100. The pushbar assembly 200' is substantially similar to the pushbar assembly 200, but does not necessarily include the above-described trim lock 300. Instead, the pushbar assembly 200' includes a mode selector 600 in communication with the electronic lock 500, for example via a wired connection 602 that passes through the door 80.

The electronic lock 500 is operable to selectively prevent the manual actuator 120 from lifting the lift finger assembly 140, and defines the locked/unlocked state of the electrified trim 100' as either a locked state or an unlocked state. In the locked state, the lock 500 prevents the manual actuator 120 from actuating the lift finger assembly 140 such that the manual actuator 120 is inoperable to actuate the latch control assembly 230. In the unlocked state, the lock 500 permits actuation of the lift finger assembly 140 by the manual actuator 120, thereby enabling the manual actuator 120 to actuate the latch control assembly 230. As described herein, the lock 500 includes an electromechanical actuator 532, the operation of which is controlled by the mode selector 600 to lock and unlock the electrified trim 100'.

Figure 12:
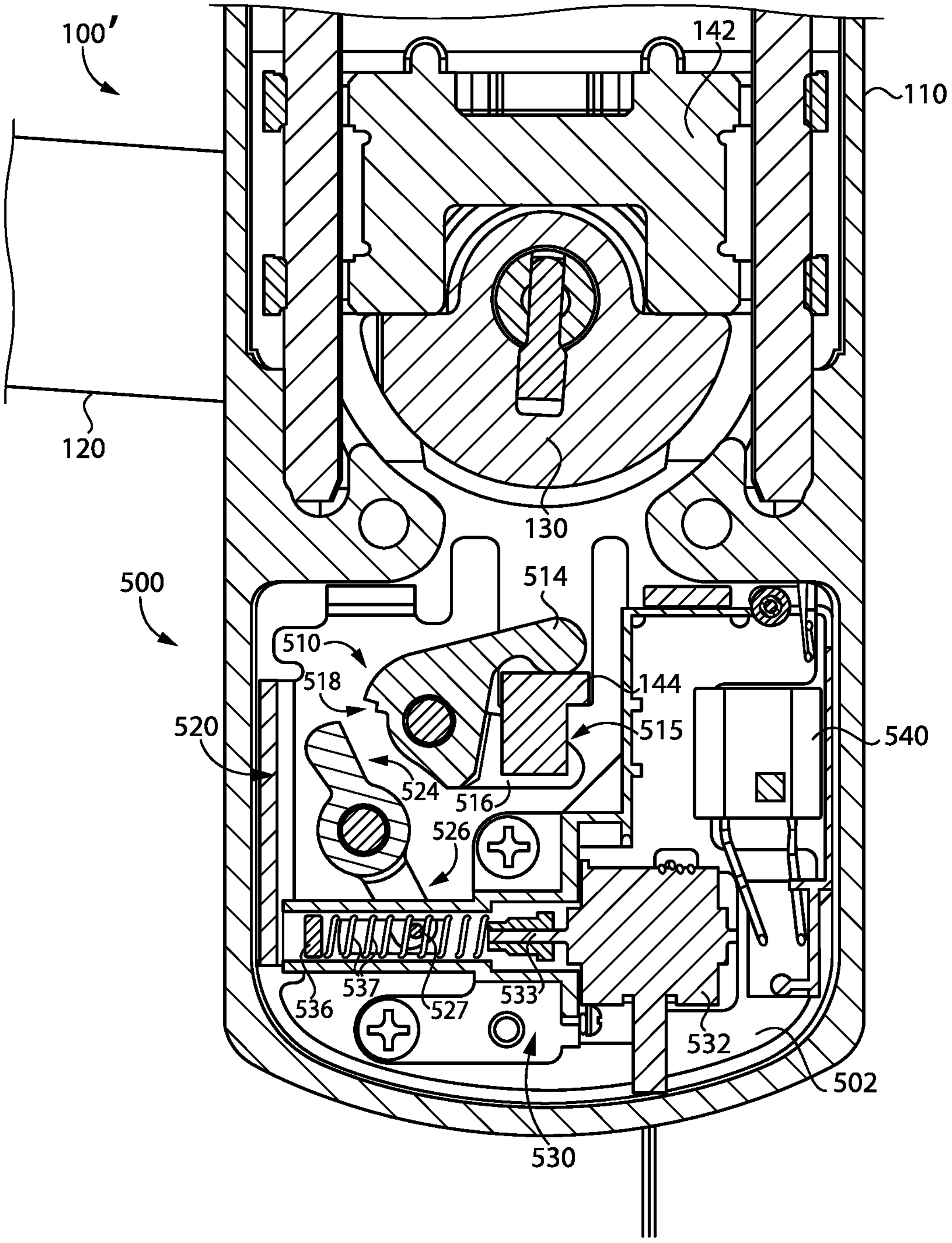
FIG. 12 is a cross-sectional illustration of an electrified trim assembly that may be used in the exit device assembly illustrated in FIG. 10.

With additional reference to FIG. 12, the illustrated electronic lock 500 generally includes an interface member in the form of a pivoting fork member 510 operable to engage the lift finger 144, a blocking member 520 configured to selectively prevent movement of the fork member 510, and a driver 530 operable to drive the blocking member 520 between a blocking position and an unblocking position. As described herein, the locked/unlocked state of the electrified trim 100' corresponds to the blocking/unblocking position of the blocking member 520. More particularly, the locked state of the electrified trim 100' is at least partially defined by the blocking member 520 being in a blocking position, and the unlocked state of the electrified trim 100' is at least partially defined by the blocking member 520 being in an unblocking position.

Figure 13:
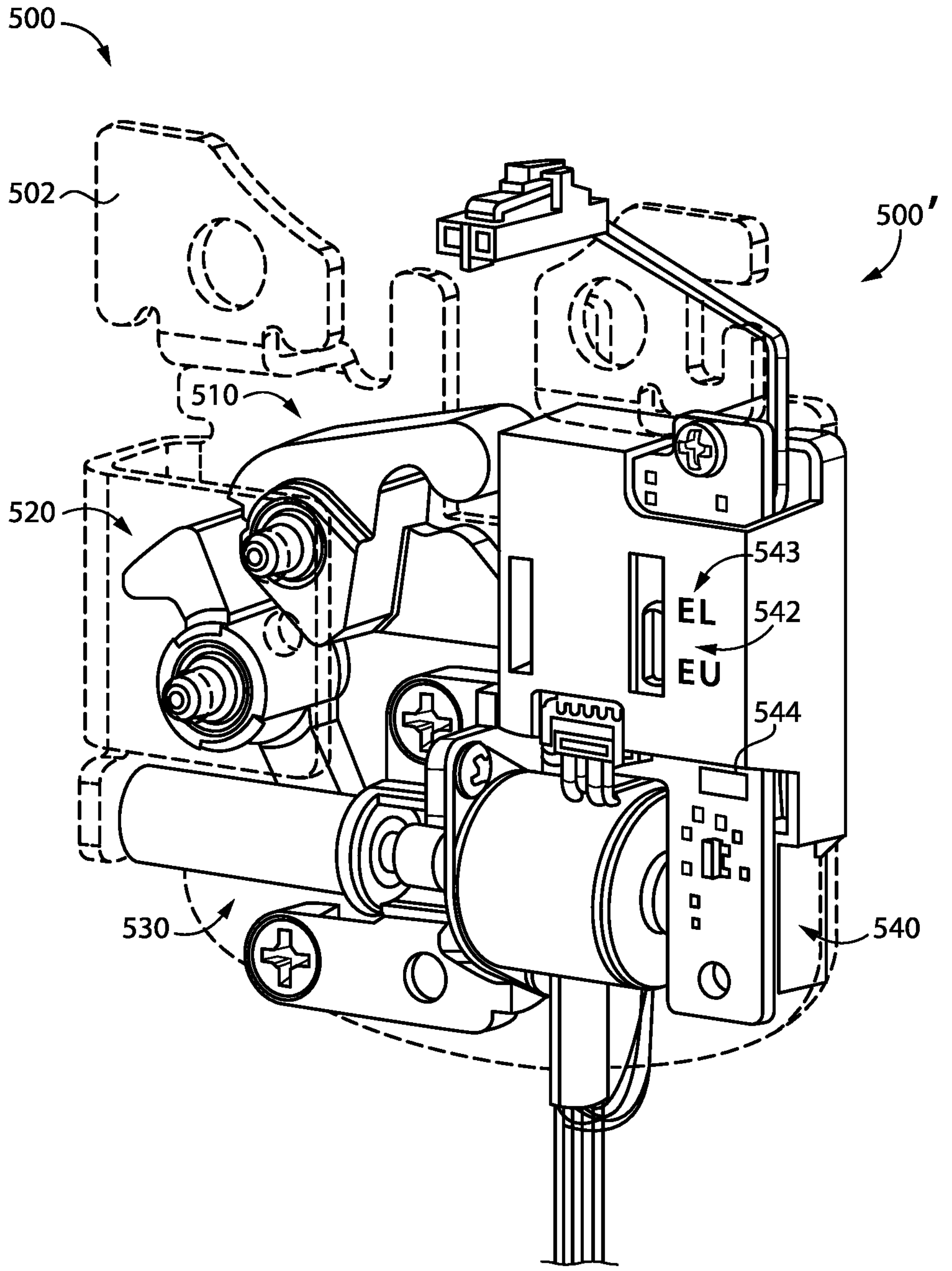
FIG. 13 is a perspective view of a modular lock mechanism according to certain embodiments.

With additional reference to FIG. 13, the electronic lock 500 may be provided as a modular electronic lock mechanism 500' in which the fork member 510, the blocking member 520, and the driver 530 are mounted to a mounting bracket 502 that allows the modular electronic lock mechanism 500' to be installed to the trim assembly 100 as a modular unit. As described herein, the electronic lock 500 may further include control circuitry 540 that aids in controlling operation of the electronic lock 500.

The fork member 510 is pivotably mounted within the escutcheon 110 (e.g., to the mounting bracket 502), and includes a body portion through which a pivot pin extends, a pair of prongs 514, 516 extending from a first side of the body portion, and a shoulder 518 extending from the opposite side of the body portion. A first prong 514 rests atop the lift finger 144 when the lift finger 144 is in its deactuated position, and a second prong 516 is positioned on the opposite side of the lift finger 144. Thus, when the lift finger 144 is in its deactuated position, the fork member 510 is in its home position, and the lift finger 144 is received in a recess 515 between the prongs 514, 516. Movement of the lift finger 144 toward its actuated position (upward in FIG. 12) causes the lift finger 144 to exert an upward force on the first prong 514, thereby urging the fork member 510 toward a pivoted position. As the lift finger 144 returns to its deactuated position, the lift finger 144 engages the second prong 516 to return the fork member 510 to its home position.

The blocking member 520 is movably mounted within the escutcheon 110 (e.g., to the mounting bracket 502), and includes a body portion through which a pivot pin extends, a blocking portion 524 extending from one side of the body portion, and an extension 526 extending from the opposite side of the body portion. The extension 526 is engaged with the driver 530 such that the driver 530 is operable to pivot the blocking member 520 between a blocking position and an unblocking position. As described herein, the blocking position is one in which the blocking portion 524 engages the shoulder 518 and prevents pivoting of the fork member 510 from its home position, and the unblocking position is one in which the blocking portion 524 disengages from the shoulder 518 such that the fork member 510 is operable to pivot between its home position and its pivoted position. In the illustrated form, the blocking member 520 pivots between its blocking position and its unblocking position. It is also contemplated that the blocking member 520 may translate between its blocking position and its unblocking position.

The driver 530 is in communication with the mode selector 600 and/or the control circuitry 540, and includes an electronic actuator 532 operable to drive an output shaft 533, and a spring 536 engaged between the output shaft 533 and the extension 526 of the blocking member 520. The actuator 532 is operable to load the spring 536 to cause the spring 536 to exert forces on the extension 526 to thereby pivot the blocking member 520 between its blocking position and its unblocking position. In the illustrated form, the spring 536 is provided in the form of a coil spring, the extension 526 includes a projection 527 that is received between coils 537 of the coil spring 536, and the actuator 532 is configured to load the spring 536 by rotating the shaft 533. The actuator 532 may, for example, be provided in the form of a stepping motor. It is also contemplated that the actuator 532 may be a linear actuator (e.g., a solenoid or a linear motor) configured to load the spring 536 by moving the shaft 533 linearly.

The control circuitry 540 is in communication with the mode selector 600, and may be operable to change the operating mode of the electronic lock 500 between a fail safe or electric locking (EL) mode and a fail secure or electronic unlocking (EU) mode. For example, the control circuitry 540 may include a mode selector switch 542 operable to toggle between the EL mode and the EU mode, and indicia 543 may be provided to indicate to the user the positions of the switch 542 that correspond to the EL mode and the EU mode. The switch 542 may, for example, be provided as a DIP switch or another form of toggle. The control circuitry 540 may further include an energy storage device 544 such as a supercapacitor, and the energy storage device 544 may be configured to store sufficient electrical energy to operate the driver 530 to move the electronic lock 500 between its locking and unlocking states.

During operation, the lock 500 and the electrified trim 100' may begin in a locking state, in which the blocking member 520 is in its blocking position. In this state, an attempt to move the lift finger 144 in the actuating direction causes the lift finger 144 to urge the fork member 510 toward its offset or pivoted position as described above. This urging causes the shoulder 518 to engage the blocking portion 524 such that the blocking member 520 retains the fork member 510 in its home position, thereby preventing movement of the lift finger 144 toward its actuated position. As a result, the actuator 120 is not operable to drive the lift finger 144 to actuate the latch control assembly 230, and the electrified trim 100' is in a locked state.

In order to transition the electrified trim 100' and the locking mechanism 500 to the unlocking states thereof, the control circuitry 540 may provide power to the actuator 532 to cause the actuator 532 to drive the shaft 533 in an unlocking direction. As the shaft 533 drives the spring 536 in the unlocking direction, one or more coils 537 of the spring 536 engage the projection 527 to urge the blocking member 520 from its blocking position to its unblocking position.

With the blocking member 520 in its unblocking position, the electronic lock 500 is in its unlocking state. In this state, the fork member 510 is free to pivot to its pivoted position, and the lift finger 144 is therefore free to move to its actuated position under the urging of the spring mechanism 132. As such, the actuator 120 is able to drive the lift finger 140 to actuate the latch control assembly 230, and the electrified trim 100' is unlocked.

In order to return the electrified trim 100' and the locking mechanism 500 to the locking states thereof, the control circuitry 540 may provide power to the actuator 532 to cause the actuator 532 to drive the shaft 533 in a locking direction opposite the unlocking direction. As the shaft 533 drives the spring 536 in the locking direction, one or more coils 537 of the spring 536 engage the projection 527 of the extension 526, thereby urging the blocking member 520 from its unblocking position to its blocking position. Should the fork member 510 be in its pivoted position when this occurs, the shoulder 518 may prevent the blocking member 520 from returning to its blocking position. In such an event, the spring 536 elastically deforms, thereby storing the mechanical energy needed to return the blocking member 520 to its blocking position. When the fork member 510 returns to its home position, the blocking member 520 becomes free to return to its blocking position, and the spring 536 releases the mechanical energy to return the blocking member 520 to its blocking position.

In certain embodiments, the lock 500 may have a default state and a non-default state. For example, when the selection switch 542 is in the electric locking (EL) position, the default state may be the unlocked state and the non-default state may be the locked state. Conversely, when the selection switch 542 is in the electric unlocking (EU) position, the default state may be the locked state and the non-default state may be the unlocked state. In certain embodiments, the mode selector 600 may selectively transmit an actuating signal that causes the lock 500 to adopt its non-default state. When the actuating signal is not being transmitted, the lock 500 may remain in its default state. When the actuating signal begins to be transmitted, the control circuitry 540 may first charge the energy storage device 544 to a charge sufficient to transition the lock 500 from its non-default state to its default state, and may then operate the driver 530 to transition the lock from its default state to its non-default state. When the actuating signal is subsequently cut, the control circuitry 540 may power the driver 530 with the electrical power stored in the energy storage device 544 to return the lock 500 to its default state. Operating based upon the presence/absence of an electrical current is similar to the operation of a solenoid, which has a default state when no power is supplied, and transitions to a non-default state when an electrical current is supplied. As such, the above-described operation of the control circuitry may be referred to as the ability to emulate a solenoid.

In the illustrated form, the electronic lock 500 is provided along the lines set forth in U.S. patent application Ser. No. 16,265,116, filed on Feb. 1, 2019, the contents of which are incorporated by reference in their entirety. It is also contemplated that the electronic lock 500 may take another form. As one example, the electronic lock 500 may include a plunger that is driven by an electromechanical actuator (e.g., a solenoid or a linear motor) into engagement with the cam 130 to selectively prevent rotation of the actuator 120. As another example, the electronic lock 500 may include a plunger that is driven by an electromechanical actuator to selectively prevent movement of the driving piece 142 and/or the lift finger 144. It is also contemplated that the electronic lock 500 may take the form of another type of electronic lock mechanism operable to selectively prevent the actuator 120 from actuating the latch control assembly 230 to retract the latchbolt 242.

Figure 14:
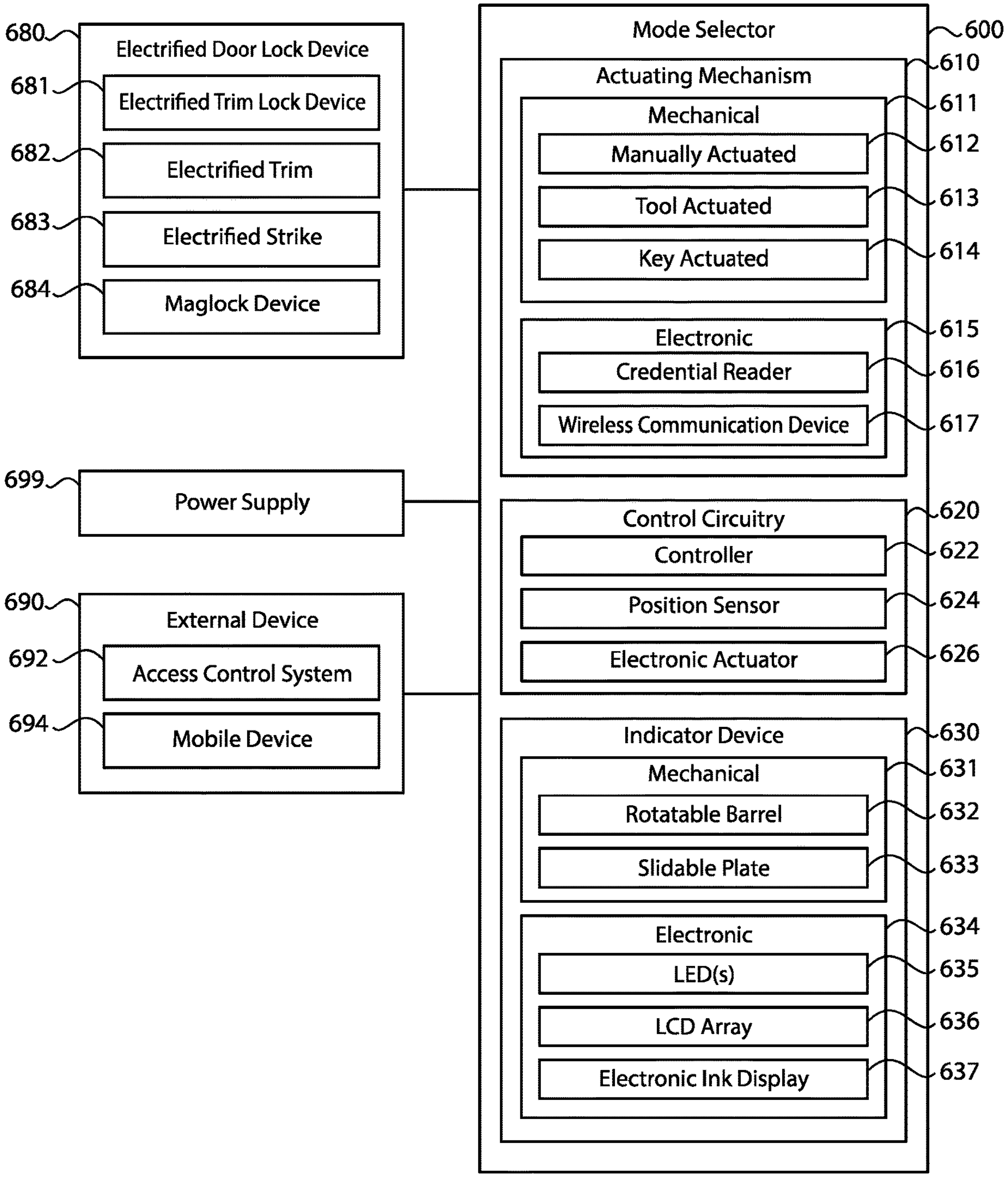
FIG. 14 is a schematic block diagram of a mode selector according to certain embodiments.

With additional reference to FIG. 14, the mode selector 600 has a locking/unlocking state, which is able to be changed between a locking state and an unlocking state. The mode selector 600 generally includes an actuating mechanism 610 operable to transition the mode selector 600 between the locking state and the unlocking state, control circuitry 620 operable to transition an electrified door lock device 680 between its locked and unlocked states based upon the state selected via the actuating mechanism 610, and an indicator device 630 configured to display locked/unlocked indicia relating to the state selected via the actuating mechanism 610. The mode selector 600 may include or be in communication with a power supply 699. In certain embodiments, the mode selector 600 may include an onboard power supply 699 such as one or more batteries. Additionally or alternatively, the mode selector 600 may be configured for connection with an external power supply 699 such as line power. In certain embodiments, the mode selector 600 may be in communication or be operable to communicate with an external device 690, such as an access control system 692 and/or a mobile device 694.

The electrified door lock device 680 has an electronically-controlled locked/unlocked state, and the mode selector 600 is operable to transition the locked/unlocked state of the door lock device 680 between a locked state and an unlocked state. More particularly, the electrified door lock device 680 includes an electronic actuator that transitions the door lock device 680 between its locked state and its unlocked state based upon signals received from the mode selector 600. In the locked state, the door lock device 680 prevents users from opening the door 80 via the manual actuator 120. In the unlocked state, the door lock device 680 permits a user to open the door 80 via the manual actuator 120.

In certain forms, the electrified door lock device 680 may include a trim lock device 681 that is mounted in the pushbar assembly 200 and is operable to selectively prevent the actuator 120 from actuating the latch control mechanism 230. For example, such a trim lock device 681 may take a form of the above-described trim lock device 300 in which the lock actuator 350 comprises an electromechanical driver (e.g., a motor or a solenoid) operable to move the blocking member 320 between its blocking and unblocking positions in response to receiving a lock/unlock signal transmitted by the mode selector 600.

In certain forms, the electrified door lock device 680 may include an electrified trim 682 including an electric lock mechanism that selectively prevents a manual actuator from actuating the latch control mechanism 230. For example, such an electrified trim 682 may take the form of the electrified trim 100', which includes the above-described electric lock 500. It is also contemplated that the electrified trim 682 may take another form that includes an electronically-actuated mechanism (e.g., a motor, a solenoid, or an electromagnet) that selectively prevents the manual actuator 120 from actuating the latch control mechanism 230.

In certain forms, the electrified door lock device 680 may include an electric strike 683 that selectively prevents opening of the door 80 when the latchbolt 242 is extended. Those skilled in the art will readily recognize that electric strikes typically include a movable keeper having an open position and a closed position, and an electronic actuator (e.g., a motor, a solenoid, or an electromagnet) that selectively retains the keeper in the closed position. When the keeper is in the closed position and the latchbolt 242 is extended, forces urging the door toward its open position cause the latchbolt 242 to urge the keeper toward its open position. When the electric strike 683 is in its locked state, the electronic actuator retains the keeper in its closed position, thereby preventing opening of the door 80. When the electric strike 683 is in its unlocked state, the keeper is able to move toward its open position, thereby permitting opening of the door 80. In certain embodiments in which the door lock device 680 is provided as an electric strike 683, the trim 100 may, for example, be provided as a fixed or dummy trim that is inoperable to actuate the latch control assembly 230.

In certain forms, the electrified door lock device 680 may include a maglock device 684 that selectively prevents opening of the door 80. Those skilled in the art will readily recognize that maglocks typically include an electromagnetic plate mounted to one of the door 80 or the frame 72 and a ferrous plate mounted to the other of the door 80 or the frame 72 such that the electromagnetic plate and the ferrous plate face each other when the door 80 is closed. When the maglock device 684 is in its locked state, the electromagnetic plate is energized to magnetically bond with the ferrous plate, thereby preventing users from opening the door 80. When the maglock device 684 is in its unlocked state, the electromagnetic plate is de-energized to permit users to open the door 80. In certain embodiments that include the maglock device 684, the pushbar assembly 200 may include a switch that de-energizes the electromagnetic plate when the pushbar 222 is depressed to provide for free egress from the secured region 84.

While certain illustrative forms of the electrified door lock device 680 have been described and illustrated, it is to be appreciated that other forms of door lock device 680 may be utilized. Such door lock devices 680 will typically include an electronic actuator (e.g. a motor, a solenoid, and/or an electromagnet) operable to transition the locked/unlocked state of the door lock device 680 between a locked state and an unlocked state.

While other locations are contemplated, in the illustrated form, the mode selector 600 is positioned in a distal portion of the pushbar assembly 200'. For example, the mode selector 600 may be positioned in the channel member 211 distally of the drive assembly 220. By way of illustration, the mode selector 600 may be positioned in the channel member 211, and the cover plate 213 may include a window 218 through which at least a portion of the indicator device 630 is visible such that the indicator device 630 is operable to display locked/unlocked indicia via the window 218. The wired connection 602 may run longitudinally through the channel member 211 to the door preparation through which the lift finger assembly 140 extends, and may run through that door preparation for connection with the electronic lock 500.

The actuating mechanism 610 is operable to transition the locking/unlocking state of the mode selector 600 between the locking state and the unlocking state. In certain embodiments, the actuating mechanism 610 may comprise a mechanical actuating mechanism 611. In certain embodiments, the actuating mechanism 610 may comprise an electronic actuating mechanism 615. While certain illustrative examples of the actuating mechanism 610 are provided herein, it is to be appreciated that the precise form of the actuating mechanism 610 is not limited to the illustrative examples.

In certain embodiments, the actuating mechanism 610 may be an unsecured actuating mechanism configured to permit any user to transition the mode selector 600 between its locking and unlocking states. For example, the actuating mechanism 610 may be a manually actuated actuating mechanism 612. Examples of unsecured forms of the actuating mechanism 610 include, by way of example, a thumbturn, a switch, a pushbutton, or other mechanisms by which the mode can be changed manually and without the use of tools. As another example, the actuating mechanism 610 may include a microphone and a controller operable to process information received from the microphone to cause the mode selector to change modes when verbally instructed to do so.

In certain embodiments, the actuating mechanism 610 may be a partially-secure actuating mechanism configured to discourage unauthorized personnel from operating the mode selector 600. For example, the actuating mechanism 610 may be a tool-actuated actuating mechanism 613. Examples of partially-secure actuating mechanisms 610 include those operated by a hex key, a screwdriver, or a grenade pin, or other types of tool-actuated actuating mechanisms 613 that require a standard tool to operate.

In certain embodiments, the actuating mechanism 610 may be a secure actuating mechanism configured to prevent unauthorized users from changing the locking/unlocking state of the mode selector 600. Examples of secure actuating mechanisms 610 include key-operated actuating mechanisms 614 (e.g., lock cylinders) credential readers 616 (e.g., card readers, biometric credential readers, fob readers, keypads, mobile device readers, or other forms of credential reader), and other types of secured devices that require that the user possess an authorized physical object (e.g., a keycard, a mechanical key, an authorized mobile device, an authorized biometric credential) and/or have a particular knowledge (e.g., a PIN code, a password, or a pass phrase).

In certain embodiments, the actuating mechanism 610 may be configured to be actuated locally, for example in embodiments in which the actuating mechanism 610 is provided as a mechanical actuating mechanism 611 or a local credential reader 616. It is also contemplated that the actuating mechanism 610 may be operable to transition the mode selector 600 between its locking state and its unlocking state in response to a remote user input. For example, the actuating mechanism 610 may include a wireless communication device 617 operable to receive actuating signals from an external device 690, such as an access control system 692 and/or a mobile device 694. It is also contemplated that a remote form of the actuating mechanism 610 may be connected with the control circuitry 620 via a wired connection.

The control circuitry 620 is configured to adjust the locked/unlocked state of the door lock device 680 between the locked and unlocked states based upon the locking/unlocking state of the mode selector 600. As described herein, the control circuitry 620 is configured to transmit a lock/unlock signal corresponding to the current locking/unlocking state of the mode selector 600, and the electronic actuator of the electrified door lock device 680 is configured to transition the door lock device 680 between its locked state and its unlocked state in response to receiving the lock/unlock signal. For example, when the current locking/unlocking state of the mode selector 600 is the locking state, the control circuitry 620 may transmit the lock/unlock signal as a lock signal to thereby cause the electronic actuator of the door lock device 680 to transition the door lock device 680 its locked state. Conversely, when the current locking/unlocking state of the mode selector 600 is the unlocking state, the control circuitry 620 may transmit the lock/unlock signal as an unlock signal to thereby cause the electronic actuator of the door lock device 680 to transition the door lock device 680 to its unlocked state.

In certain embodiments, such as those in which the electronic actuator of the electrified door lock device 680 is provided in the form of a solenoid or an electromagnet, the control circuitry 620 may provide power to the electronic actuator when the mode selector 600 is in a first state (e.g., a non-default state), and may cut power to the electronic actuator when the mode selector 600 is in a second state (e.g., a default state). For example, if the electrified door lock device 680 is operating in an electric locking (EL)

mode, the non-default state is the locking state and the default state is the unlocking state. In such circumstances, the lock signal may comprise an electrical current operable to actuate the solenoid or electromagnet, and the unlock signal may comprise the absence of such an electrical current. As another example, if the electrified door lock device 680 is operating in an electric unlocking (EU) mode, the default state is the locking state and the non-default state is the unlocking state. In such circumstances, the unlock signal may comprise an electrical current operable to actuate the solenoid or electromagnet, and the lock signal may comprise absence of such an electrical current. The control circuitry 620 may similarly selectively provide power to the electrified door lock device 680 in embodiments in which the door lock device 680 is configured to emulate solenoid operation.

In certain embodiments, such as those in which the electronic actuator of the electrified door lock device 680 comprises a motor, the control circuitry 620 may transmit a locking signal when the mode selector 600 transitions from the unlocking state to the locking state, and may transmit an unlocking signal when the mode selector 600 transitions from the locking state to the unlocking state. For example, in embodiments in which the electronic actuator of the door lock device 680 comprises a stepper motor, the locking signal may be provided as a series of electrical pulses that cause the stepper motor to drive the output shaft in a locking direction to lock the door lock device 680, and the unlocking signal may be provided as a series of electrical pulses that cause the stepper motor to drive the output shaft in an unlocking direction to unlock the door lock device 680.

In certain embodiments, the control circuitry 620 may include one or more of a controller 622, a position sensor 624, and/or an electronic actuator 626. For example, should the actuating mechanism 610 comprise a credential reader 616, a controller 622 may facilitate operation of the credential reader 616. In certain embodiments, such as those in which the actuating mechanism 610 is provided as a mechanical actuating mechanism 611, the position sensor 624 may detect a position of a movable component of the mechanical actuating mechanism 611 to facilitate the adjustment of the locking/unlocking state of the mode selector 600. In certain embodiments, such as those in which the indicator device 630 comprises a mechanical indicator device 631, an electronic actuator 626 (e.g. a motor, a solenoid, and/or an electromagnet) may facilitate control of the mechanical indicator device 631 by the control circuitry 620.

In the illustrated form, each of the electronic lock 500 and the mode selector 600 includes a corresponding and respective set of control circuitry 540, 620. It is also contemplated that the control circuitry 540, 620 may be consolidated into a single set of control circuitry. For example, the mode selector control circuitry 620 may include one or more features of the lock control circuitry 540 (e.g., the EL/EU selector 542 and/or the energy storage device 544), and may perform corresponding functions described above with reference to the lock control circuitry 540.

The indicator device 630 is configured to display locked/unlocked indicia relating to the locking/unlocking state of the mode selector 600, which corresponds to the locked/unlocked state of the electrified trim 100'. The indicator device 630 has a lock-indicating state corresponding to the locking state of the mode selector 600 and an unlock-indicating state corresponding to the unlocking state of the mode selector 600. In certain embodiments, the indicator device 630 may display locked indicia (e.g., a first color and/or a first symbol) when in its lock-indicating state, thereby indicating to users that the outside trim 100' is in its locked state. Additionally or alternatively, the indicator device 630 may display unlocked indicia (e.g., a second color and/or a second symbol) when in its unlock-indicating state, thereby indicating to users that the outside trim 100' is in its unlocked state, in which the door lock device 680 prevents the handle 120 from opening the door 80.

In certain embodiments, the indicator device 630 may comprise a mechanical indicator device 631, such as a rotatable barrel 632 or a movable plate 633 that moves to selectively display the locked/unlocked indicia. By way of example, the indicator device 630 may be provided along the lines set forth in U.S. Pat. No. 9,945,158, issued Apr. 17, 2018, the contents of which are incorporated by reference in their entirety. As another example, the indicator device 630 may be provided as a plate 633 having the locking and/or unlocking indicia printed or otherwise provided thereto.

In certain embodiments, the indicator device 630 may comprise an electronic indicator device 634. As one example, the indicator device 630 may include one or more light emitting diodes (LEDs) 635 operable to display the locked indicia and/or the unlocked indicia. As another example, the indicator device 630 may include a display device operable to display the locked indicia and/or the unlocked indicia. Examples of display devices include without limitation LED displays 635, liquid crystal display (LCD) arrays 636, electronic ink displays 637, and others.

In certain embodiments, actuation of the indicator device 630 between its lock-indicating state and its unlock-indicating state may occur at least partially mechanically. As one example, physical actuation of a mechanical actuating mechanism 611 (e.g., a lock cylinder or a thumbturn) may directly or indirectly move the mechanical indicator device 631 (e.g., a barrel 632 or a plate 633) between its lock-indicating state and its unlock-indicating state, for example as described in the above-referenced U.S. Pat. No. 9,945,158.

In certain embodiments, actuation of the indicator device 630 between its lock-indicating state and its unlock-indicating state may occur at least partially electronically. By way of example, the actuating mechanism 610 may include a credential reader 616, and the control circuitry 620 may electronically cause the electronic indicator device 634 to transition between its lock-indicating state and its unlock-indicating state when an authorized credential is presented to the credential reader 616. Should the indicator device 630 be provided as a mechanical indicator device 631, the control circuitry 620 may include an electronic actuator 626 that drives the mechanical indicator device 631 between its lock-indicating state and its unlock-indicating state in response to activation of the electronic actuating mechanism 615. Should the indicator device 630 be provided as an electronic indicator device, the control circuitry 620 may electronically control the electronic indicator device 634 to transition between its lock-indicating state and its unlock-indicating state in response to receiving an appropriate command or signal from the electronic actuating mechanism 615.

In certain embodiments, actuation of the indicator device 630 between its lock-indicating state and its unlock-indicating state may be partially mechanical and partially electronic. As one example, physical actuation of a mechanical actuating mechanism 611 may be sensed by a position sensor 624 of the control circuitry 620. Should the indicator device 630 be provided as a mechanical indicator device 631, the control circuitry 620 may include an electronic actuator 626 that drives the mechanical indicator device 631 between its lock-indicating state and its unlock-indicating state based upon information generated by the position sensor 624. Should the indicator device 630 be provided as an electronic indicator device 634, the control circuitry 620 may electronically cause the electronic indicator device 634 to transition between its lock-indicating state and its unlock-indicating state based upon the information generated by the position sensor 624.

Figure 15:
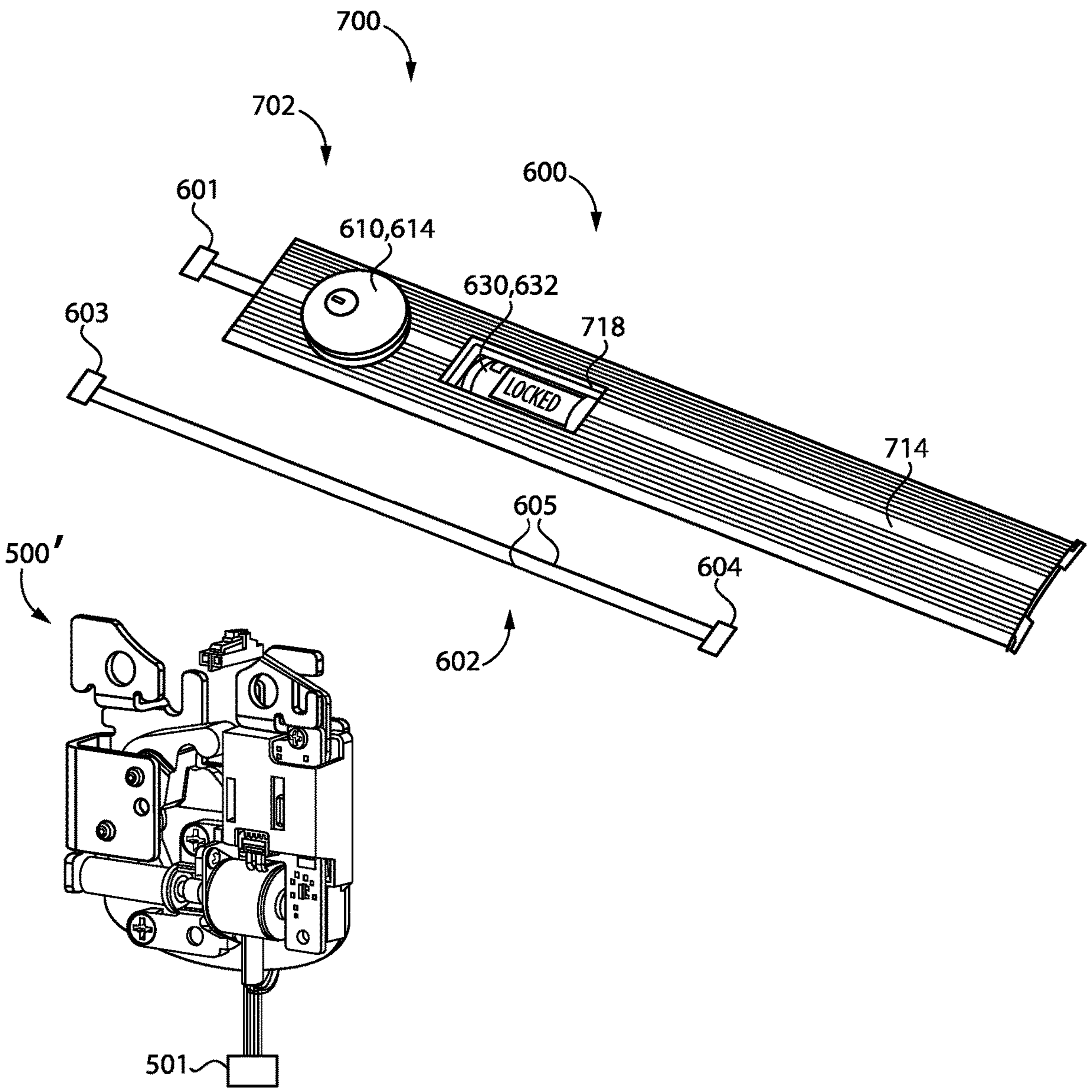
FIG. 15 is a perspective illustration of a retrofit kit according to certain embodiments.

With additional reference to FIG. 15, certain embodiments of the present application relate to a retrofit kit 700 for an exit device assembly. For example, the above-described exit device assembly 90 may lack the trim lock device 300, and the retrofit kit 700 may be configured for use with such an exit device assembly 90. The retrofit kit 700 generally includes pushbar retrofit assembly 702, which generally includes a retrofit cover plate 713 and a mode selector 600 mounted to the retrofit cover plate 600. The retrofit plate 713 is sized and shaped to replace the existing cover plate 213 of the pushbar assembly 200, and includes a window 718 through which at least a portion of the indicator device 630 is visible.

The retrofit kit 700 may further include a wired connection 602 operable to connect the mode selector 600 with the electrified door lock device 680. In certain embodiments, the retrofit kit 700 may further include one or more components of the electrified door lock device 680. While other forms are contemplated, the illustrated retrofit kit 700 includes a modular lock mechanism 500'.

In the illustrated form, the wired connection 602 includes a first electrical connector 603 configured to mate with an electrical connector 601 of the mode selector 600, a second electrical connector 604 configured to mate with an electrical connector 501 of the modular lock mechanism 500', and one or more wires 605 extending between and connecting the electrical connectors 603, 604. It is also contemplated that one or both of the connectors 603, 604 may be omitted, for example in embodiments in which the corresponding one of the connectors 501, 601 is omitted or configured for direct connection with the wires 605. The length of the wired connection 602 is sufficient to extend from the location of the mode selector 600 (e.g., in the distal portion of the channel member 211), through the channel member 211 and into connection with the modular lock mechanism 500', which is to be mounted within the trim 100' on the exterior side 81 of the door 80. In certain embodiments, the length of the electrical connector 602 may be sufficient to extend at least partially through the door 80. In certain embodiments, the wires connected to the lock electrical connector 501 may have a length sufficient to extend at least partially through the door 80.

In the embodiment illustrated in FIG. 15, the actuating mechanism 610 is provided in the form of a mechanical actuating mechanism 611, and the indicator device 630 is provided in the form of a mechanical indicator device 631. More particularly, the actuating mechanism 610 is provided in the form of the key-actuated mechanism 614, and the indicator device 630 comprises the rotatable barrel 632. It is also contemplated that the mode selector 600 of the retrofit kit 700 may include an actuating mechanism 610 of another form and/or an indicator device 630 of another form. Examples of such other forms for the actuating mechanism 610 and the indicator device 630 are provided above.

Figure 16:
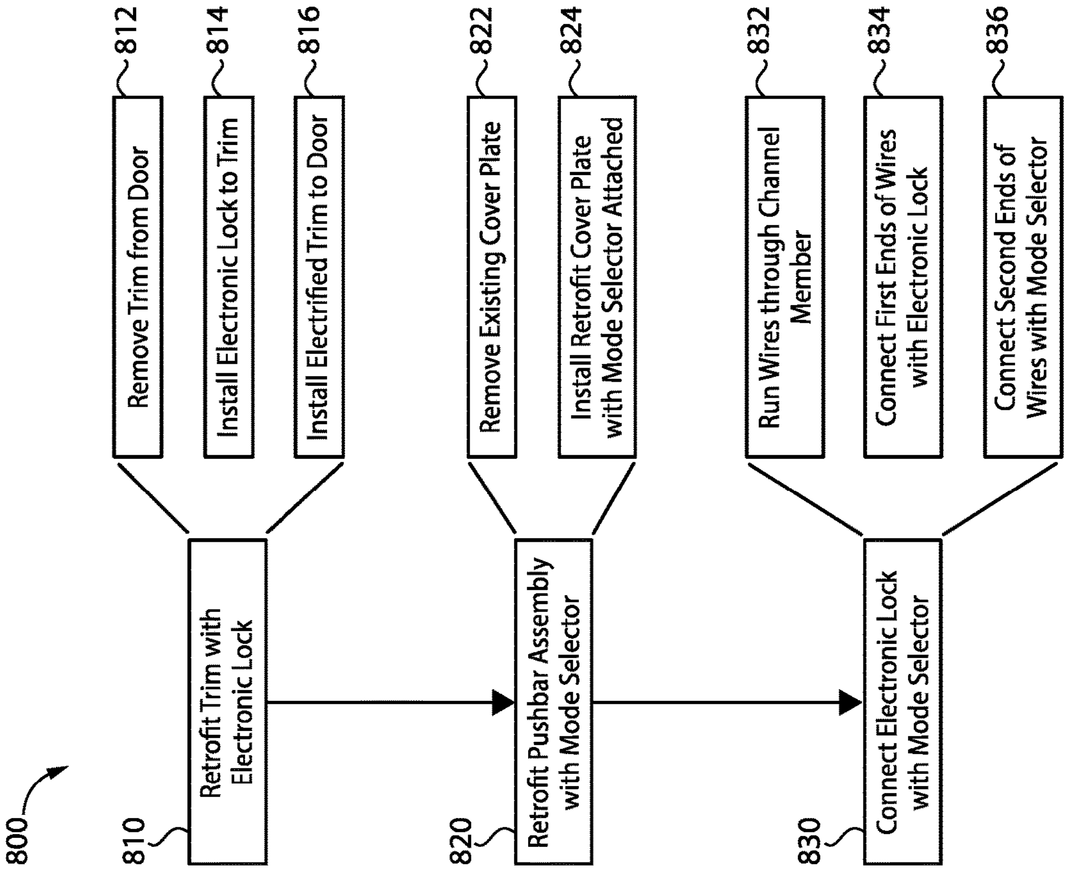
FIG. 16 is a schematic flow diagram of a process according to certain embodiments.

With additional reference to FIG. 16, illustrated therein is an example process 800 for installing a retrofit kit to an existing exit device assembly. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 800 is described herein with specific reference to the retrofit kit 700 illustrated in FIG. 15, it is to be appreciated that the process 800 may be performed to install other retrofit kits having additional or alternative features.

The process 800 generally includes a trim retrofitting procedure 810, a pushbar assembly retrofitting procedure 820, and a connecting procedure 830. As described herein, the trim retrofitting procedure 810 generally involves installing the modular lock mechanism 500' to the trim 100 to form the electrified trim 100', the pushbar retrofitting procedure 820 generally involves installing the pushbar retrofit assembly 702 to a traditional pushbar assembly 200 to form the mode selecting pushbar assembly 200', and the connecting procedure 830 generally involves connecting the lock device 500' with the mode selector 600.

The trim retrofitting procedure 810 generally involves installing an electric lock to the trim assembly 100 such that the electric lock is operable to selectively lock the trim assembly 100. In the illustrated form, the trim retrofitting procedure 810 generally involves installing the modular lock mechanism 500' to the trim assembly 100 to form the electrified trim 100'. In certain embodiments, such as those in which the trim assembly 100 is mounted to the door 80, the procedure 810 may include block 812, which generally involves removing the trim assembly 100 from the door 80.

The trim retrofitting procedure 810 includes block 814, which generally involves mounting the electronic lock within the escutcheon 110. In the illustrated form, block 814 generally involves mounting modular trim assembly 500' within the escutcheon 110 such that the hook member 510 is engaged with the lift finger 144. Engaging the hook member 510 with the lift finger 144 may, for example, involve placing an extension or ledge of the lift finger 144 within the recess 515 formed between the prongs 514, 516. Mounting the modular lock mechanism 500' within the escutcheon 110 may, for example, involve securing the mounting bracket 502 to the escutcheon using releasable fasteners (e.g., screws, adhesives, or other forms of releasable fastening mechanisms) and/or using permanent fasteners (e.g., welds, rivets, or other forms of permanent fastening mechanisms).

The trim retrofitting procedure 810 may further include block 816, which generally involves mounting the retrofitted trim 100' to the door 80. Block 816 may, for example, involve extending the lift finger 144 through the door preparation in the door 80 to engage the appropriate driver 236, and securing the electrified trim 100' to the door 80.

While the illustrated embodiment of the trim retrofitting procedure 810 generally involves installing the modular lock mechanism 500' to the trim assembly 100 to form the electrified trim 100', it is also contemplated that the trim retrofitting procedure 810 may take another form. For example, in embodiments in which the electric lock is provided in a form other than the illustrated modular lock mechanism 500', the procedure 810 may involve installing such other form of electric lock according to the procedures appropriate for such installation.

In embodiments in which the electrified door lock device 680 is provided in a form other than the electrified trim 100', 682, the process 800 may include installing such other embodiments of the electrified door lock device 680 to an appropriate location. As one example, should the door lock device 680 comprise a trim lock device 681 such as the trim lock device 300, the process 800 may include installing the trim lock device 300, 681 to the pushbar assembly 200. As another example, should the door lock device 680 comprise an electric strike 683, the process 800 may involve installing the electric strike 683 to the latch jamb 75. As a further example, should the door lock device 680 comprise a maglock device 684, the process 800 may involve installing the electromagnetic plate to one of the door 80 or the frame 72 and installing the ferrous plate to the other of the door 80 or the frame 72.

The pushbar assembly retrofitting procedure 820 generally involves installing a mode selector to a pushbar assembly, and in the illustrated form, generally involves installing the pushbar retrofit assembly 702 to a traditional pushbar assembly 200 to form the mode selecting pushbar assembly 200'. In certain embodiments, the procedure 820 may include block 822, which generally involves removing an existing cover plate from an existing pushbar assembly. In the illustrated form, block 822 generally involves removing the cover plate 213 from the existing pushbar assembly 200, thereby exposing an opening in the channel member 211.

The pushbar assembly retrofitting procedure 820 includes block 824, which generally involves installing a pushbar retrofit assembly to a pushbar assembly. In the illustrated form, block 824 generally involves installing the pushbar retrofit assembly 702 to the pushbar assembly 200. Block 824 may, for example, involve sliding the retrofit cover plate 713 into the space previously occupied by the cover plate 213, thereby placing the mode selector 600 that is mounted to the cover plate 713 in the proper position.

The connecting procedure 830 generally involves placing the mode selector 600 in communication with the electrified door lock device 680. In the illustrated form, the connecting procedure 830 involves electrically connecting the mode selector 600 with the electronic lock 500 via a wired connection 602. It is also contemplated that the mode selector 600 may be placed in wireless communication with the door lock device 680, for example in embodiments in which both the mode selector 600 and the door lock device 680 include wireless communication capabilities.

The connecting procedure 830 may include block 832, which generally involves running the wired connection 602 through the channel member 211 such that opposite ends of the wired connection 602 are capable of being connected with the lock 500 and the mode selector 600. Block 832 may, for example, be performed after removing the existing cover plate 213 and prior to fully installing the new cover plate 713.

The connecting procedure 830 may include block 834, which generally involves connecting first ends of the wires 605 with the door lock device 680. In the illustrated form, block 834 involves connecting first ends of the wires 605 with the electronic lock 500. Block 834 may, for example, involve engaging the connectors 501, 604 with one another. It is also contemplated that block 834 may involve connecting the first ends of the wires 605 with the electronic lock 500 in another manner, such as by twisting the first end of one or more wires 605 with corresponding wires of the lock 500 and/or soldering the first end of one or more wires 605 to a connection point of the control circuitry 540. Block 834 may, for example, be performed prior to mounting the electrified trim 100' to the door 80 in block 816.

The connecting procedure 830 may include block 836, which generally involves connecting second ends of the wires 605 with the mode selector 600. Block 834 may, for example, involve engaging the connectors 601, 603 with one another. It is also contemplated that block 834 may involve connecting the second ends of the wires 605 with the mode selector 600 in another manner, such as by twisting the second end of one or more wires 605 with corresponding wires of the mode selector 600 and/or soldering the second end of one or more wires 605 to a connection point of the control circuitry 620. Block 836 may, for example, be performed prior to placing the pushbar retrofit assembly 702 in its final position in block 824.

Figure 17:
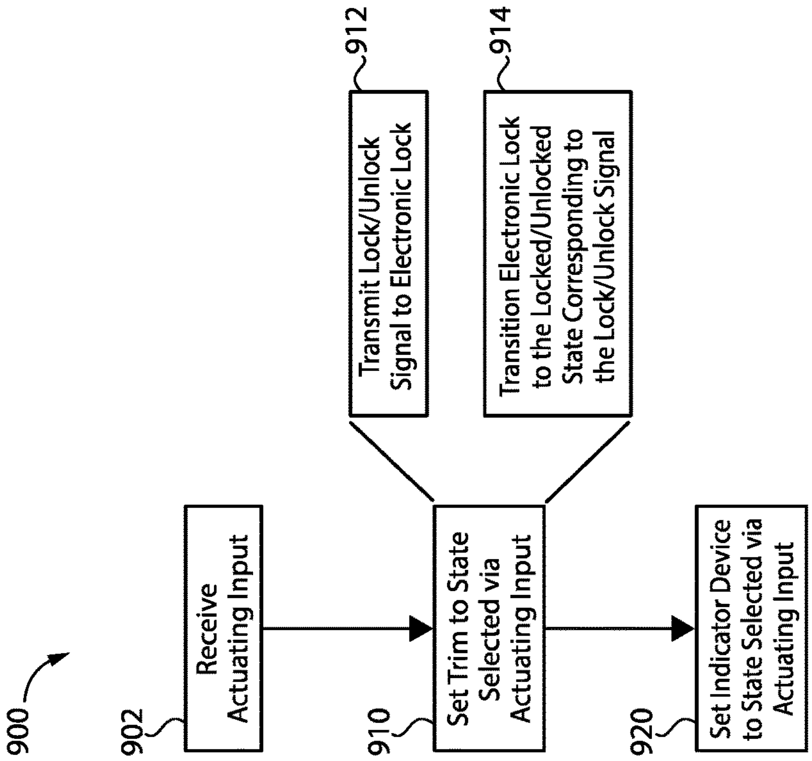
FIG. 17 is a schematic flow diagram of a process according to certain embodiments.

With additional reference to FIG. 17, illustrated therein is an example process 900 for operating an exit device assembly. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 900 is described herein with specific reference to the exit device assembly 90' and corresponding components illustrated in FIGS. 10-14, it is to be appreciated that the process 800 may be performed to install other retrofit kits having additional or alternative features.

The process 900 may begin with block 902, which generally involves receiving an actuating input via an actuating mechanism 610. The actuating input is an input to the actuating mechanism 610 that is operable to change the locking/unlocking state of the mode selector from a prior locking/unlocking state (i.e., one of the locking state or the unlocking state) to a current locking/unlocking state (i.e., the other of the locking state or the unlocking state). In certain forms, the actuating input may comprise a mechanical actuating input, such as pressing a button of a manually actuated actuating mechanism 612, switching a toggle of a manually actuated actuating mechanism 612, rotating a thumbturn of a manually actuated actuating mechanism 612, inserting and rotating a hex key into a tool actuated actuating mechanism 613, and/or inserting and rotating a coded key into a key actuated actuating mechanism 614. In certain embodiments, the actuating input may comprise an electronic actuating input, such as presentation of a credential (e.g., a card, a fob, a biometric credential, a mobile device credential, or another form of credential) to a credential reader 616 and/or receiving a remote actuating input via a wireless communication device 617 and/or a wired connection. Regardless of the precise form of the actuating input, the actuating input is one that is sufficient to transition the locking/unlocking state of the mode selector 600 between the locking state and the unlocking state.

The process 900 includes a lock/unlock procedure 910, which may be performed in response to the receipt of the actuating input in block 902. The lock/unlock procedure 910 generally involves setting the electrified trim 100' to the locked/unlocked state corresponding to the current locking/unlocking state of the mode selector 600 (i.e., the state selected by the actuating input received in block 902). The lock/unlock procedure 910 may, for example, involve transitioning the electrified trim 100' from a prior locked/unlocked state corresponding to the prior locking/unlocking state of the mode selector 600 to a current locked/unlocked state corresponding to the current locking/unlocking state of the mode selector 600.

The lock/unlock procedure 910 includes block 912, which generally involves transmitting a lock/unlock signal to the electrified door lock device 680. The lock/unlock signal is a signal operative to cause the door lock device 680 to transition to the locked/unlocked state corresponding to the locking/unlocking state selected by the actuating input received in block 902. For example, the lock/unlock signal may be a lock signal when the actuating input has set the mode selector 600 to the locking state (i.e., when the current locking/unlocking state is the locking state), and may be an unlock signal when the actuating input has set the mode selector 600 to the unlocking state (i.e., when the current locking/unlocking state is the unlocking state).

In certain embodiments, the lock/unlock signal may be provided as the presence or absence of current being supplied to the door lock device 680, which in the illustrated form comprises the electronic lock 500. For example, should the selected locking/unlocking state correspond to the non-default state of the electronic lock 500, the lock/unlock signal may be provided as an electrical current supplied to the electronic lock control circuitry 540. Should the locking/unlocking state correspond to the default state of the electronic lock 500, the lock/unlock signal may be provided as a cessation of the electrical current to the electronic lock control circuitry 540. By way of example, the lock/unlock signal may be provided as the presence/absence of a current in embodiments in which the electromechanical driver 532 is provided as a solenoid and/or in embodiments in which the control circuitry 540 is configured to emulate a solenoid.

It is also contemplated that the lock/unlock signal may take another form, for example in embodiments in which the control circuitry 540 is not configured to emulate a solenoid. For example, the lock signal may be provided as a first signal that causes the driver 530 to urge the blocking member 520 from its unblocking position toward its blocking position, and the unlock signal may be provided as a second signal that causes the driver 530 to urge the blocking member 520 from its blocking position toward its unblocking position. By way of illustration, in embodiments in which the driver 530 comprises a stepper motor, the first signal may include a first series of electrical pulses of a first polarity, and the second signal may include a second series of electrical pulses of a second polarity opposite the first polarity.

As will be appreciated, the lock/unlock signal may be sent by the mode selector control circuitry 620 in response to receiving the actuating input and/or a signal indicative of the same. For example, in embodiments in which the actuating input is provided electronically (e.g., via the electronic actuating mechanism 615), the transmission in block 912 may be performed in response to receiving the electronic actuating input. In embodiments in which the actuating input is provided at least partially mechanically (e.g., via the mechanical actuating mechanism 611), the transmission in block 912 may be performed based upon the state of a position sensor 624 operable to sense the position of a moving component of the mechanical actuating mechanism 611. As one example, the moving component may trip a position sensor 624 in the form of a switch that selectively transmits the electrical current to the electronic lock control circuitry 540.

The lock/unlock procedure 910 also includes block 914, which generally involves transitioning the door lock device 680 to the locked/unlocked state corresponding to the lock/unlock signal such that the locked/unlocked state of the door lock device 680 corresponds to the current locking/unlocking state of the mode selector 600. Block 914 may be performed at least in part by the electronic actuator of the door lock device 680 in response to receiving the lock/unlock signal from the control circuitry 620.

In the illustrated embodiment, the door lock device 680 is provided as an electrified trim 682, and more particularly as an electrified trim 100' that includes the electronic lock 500. When the lock/unlock signal is provided as the lock signal, the lock signal causes the driver 530 to urge the blocking member 520 toward its blocking position, thereby locking the electrified trim 100'. When the lock/unlock signal is provided as the unlock signal, the unlock signal causes the driver 530 to urge the blocking member 520 toward its unblocking position, thereby unlocking the electrified trim 100'.

In certain embodiments, the door lock device 680 may comprise a trim lock device 681, such as the above-described trim lock device 300. In such forms, block 914 may involve operating an electronic actuator (e.g., a motor, solenoid, and/or electromagnet) of the lock actuator 350 to drive the blocking member 330 between its blocking and unblocking positions. For example, when the lock/unlock signal is provided as the lock signal, block 914 may involve operating the electronic form of the lock actuator 350 to move the blocking member 330 to its blocking position, thereby locking the door 80 in the manner described above. When the lock/unlock signal is provided as the unlock signal, block 914 may involve operating the electronic form of the lock actuator 350 to move the blocking member 330 to its unblocking position, thereby unlocking the door 80 in the manner described above.

In certain embodiments, the door lock device 680 may comprise an electric strike 683. In such forms, block 914 may involve operating an electronic actuator of the electric strike 683 to move a blocking member between a blocking position and an unblocking position to selectively prevent movement of the keeper from its closed position. For example, when the lock/unlock signal is provided as the lock signal, block 914 may involve operating the electronic actuator of the electric strike 683 to move the blocking member to its blocking position, thereby preventing movement of the keeper from its pivoted position and locking the door 80 as described above. When the lock/unlock signal is provided as the unlock signal, block 914 may involve operating the electronic actuator of the electric strike 683 to move the blocking member to its unblocking position, thereby permitting movement of the keeper to its open position and unlocking the door 80 as described above.

In certain embodiments, the door lock device 680 may comprise a maglock device 684. In such forms, block 914 may involve operating an electromagnet of the maglock device 684 to selectively bond the ferrous plate to the electromagnetic plate. For example, when the lock/unlock signal is provided as the lock signal, block 914 may involve operating the maglock device 684 to activate the electromagnetic plate, thereby binding the ferrous plate to the electromagnetic plate and locking the door 80 as described above. When the lock/unlock signal is provided as the unlock signal, block 914 may involve cutting power to the electromagnetic plate, thereby unlocking the door 80 as described above.

The process 900 may further include an indicating procedure 920, which generally involves setting the indicator device 630 to a state corresponding to the locking/unlocking state of the mode selector 600. More particularly, the indicating procedure 920 involves causing the indicator device 630 to display locked/unlocked indicia corresponding to the current locking/unlocking state of the mode selector 600. The indicating procedure 920 may, for example, be performed in response to the actuating input being received in block 902. As one example, physical actuation of a mechanical actuating mechanism 611 (e.g., a lock cylinder or a thumbturn) may directly or indirectly move the mechanical indicator device 631 (e.g., a barrel 632 or a plate 633) between its lock-indicating state and its unlock-indicating state.

In certain embodiments, the indicating procedure 920 may be performed at least partially mechanically. As noted above, in certain embodiments, actuation of the indicator device 630 between its lock-indicating state and its unlock-indicating state may occur at least partially mechanically. In such forms, mechanical actuation of the indicator device 630 may take place along the lines set forth above. By way of example, the actuating mechanism 610 may include a credential reader 616, and the indicating procedure 920 may include the control circuitry 620 causing the electronic indicator device 634 to transition between its lock-indicating state and its unlock-indicating state when an authenticated credential is presented to the credential reader 616. Should the indicator device 630 be provided as a mechanical indicator device 631, the indicating procedure 920 may include the control circuitry 620 causing an electronic actuator 626 to drive the mechanical indicator device 631 between its lock-indicating state and its unlock-indicating state in response to activation of the electronic actuating mechanism 615. Should the indicator device 630 be provided as an electronic indicator device 634, the indicating procedure 920 may include the control circuitry 620 controlling the electronic indicator device 634 to transition between its lock-indicating state and its unlock-indicating state in response to receiving an appropriate command or signal from the electronic actuating mechanism 615.

In certain embodiments, the indicating procedure 920 may be performed at least partially electronically. As noted above, in certain embodiments, actuation of the indicator device 630 between its lock-indicating state and its unlock-indicating state may occur at least partially electronically. In such forms, the at least partially electronic actuation of the indicator device 630 may take place along the lines set forth above. As one example, physical actuation of a mechanical actuating mechanism 611 may be sensed by a position sensor 624 of the control circuitry 620. Should the indicator device 630 be provided as a mechanical indicator device 631, the indicating procedure 920 may involve the control circuitry 620 electronically operating an electronic actuator 626 to drive the mechanical indicator device 631 between its lock-indicating state and its unlock-indicating state based upon information generated by the position sensor 624. Should the indicator device 630 be provided as an electronic indicator device 634, the indicating procedure 920 may involve the control circuitry 620 electronically causing the electronic indicator device 634 to transition between its lock-indicating state and its unlock-indicating state based upon the information generated by the position sensor 624.

In certain embodiments, the indicating procedure 920 may be performed at least partially mechanically. As noted above, in certain embodiments, actuation of the indicator device 630 between its lock-indicating state and its unlock-indicating state may occur partially mechanically and partially electronically. In such forms, a hybrid mechanical-electrical actuation of the indicator device 630 may take place along the lines set forth above.

Figure 18:
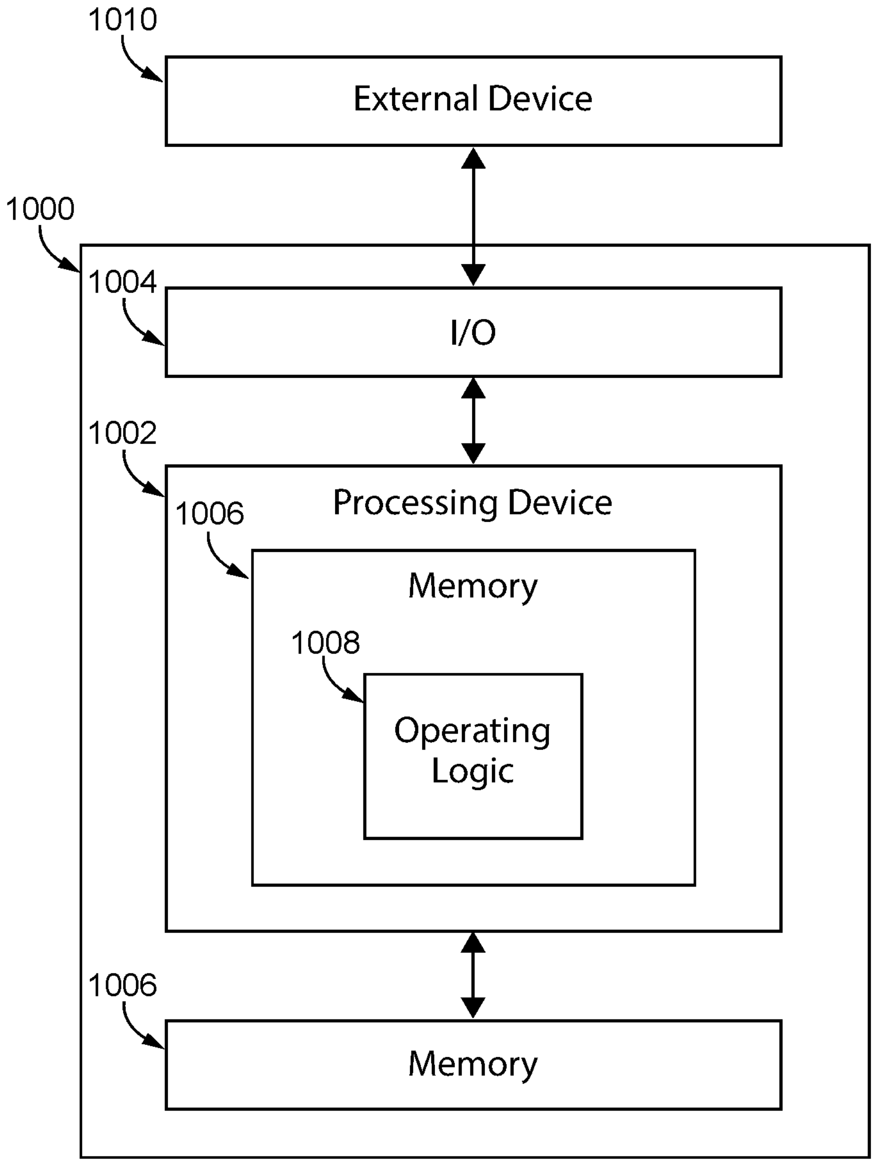
FIG. 18 is a schematic block diagram of a computing device according to certain embodiments.

Referring now to FIG. 18, a simplified block diagram of at least one embodiment of a computing device 1000 is shown. The illustrative computing device 1000 depicts at least one embodiment of a controller that may be utilized in connection with the controller 622 illustrated in FIG. 14.

Depending on the particular embodiment, the computing device 1000 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 1000 includes a processing device 1002 that executes algorithms and/or processes data in accordance with operating logic 1008, an input/output device 1004 that enables communication between the computing device 1000 and one or more external devices 1010, and memory 1006 which stores, for example, data received from the external device 1010 via the input/output device 1004.

The input/output device 1004 allows the computing device 1000 to communicate with the external device 1010. For example, the input/output device 1004 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 1000. The input/output device 1004 may include hardware, software, and/or firmware suitable for performing the techniques described herein.

The external device 1010 may be any type of device that allows data to be inputted or outputted from the computing device 1000. For example, in various embodiments, the external device 1010 may be embodied as the electronic lock 500, the electronic actuating mechanism 615, the position sensor 624, the electronic actuator 626, the electronic indicator device 634, the electrified door lock device 680, and/or the external device 690. Further, in some embodiments, the external device 1010 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 1010 may be integrated into the computing device 1000.

The processing device 1002 may be embodied as any type of processor(s) capable of performing the functions described herein. In particular, the processing device 1002 may be embodied as one or more single or multi-core processors, microcontrollers, or other processor or processing/controlling circuits. For example, in some embodiments, the processing device 1002 may include or be embodied as an arithmetic logic unit (ALU), central processing unit (CPU), digital signal processor (DSP), and/or another suitable processor(s). The processing device 1002 may be a programmable type, a dedicated hardwired state machine, or a combination thereof. Processing devices 1002 with multiple processing units may utilize distributed, pipelined, and/or parallel processing in various embodiments. Further, the processing device 1002 may be dedicated to performance of just the operations described herein, or may be utilized in one or more additional applications. In the illustrative embodiment, the processing device 1002 is of a programmable variety that executes algorithms and/or processes data in accordance with operating logic 1008 as defined by programming instructions (such as software or firmware) stored in memory 1006. Additionally or alternatively, the operating logic 1008 for processing device 1002 may be at least partially defined by hardwired logic or other hardware. Further, the processing device 1002 may include one or more components of any type suitable to process the signals received from input/output device 1004 or from other components or devices and to provide desired output signals. Such components may include digital circuitry, analog circuitry, or a combination thereof.

The memory 1006 may be of one or more types of non-transitory computer-readable media, such as a solid-state memory, electromagnetic memory, optical memory, or a combination thereof. Furthermore, the memory 1006 may be volatile and/or nonvolatile and, in some embodiments, some or all of the memory 1006 may be of a portable variety, such as a disk, tape, memory stick, cartridge, and/or other suitable portable memory. In operation, the memory 1006 may store various data and software used during operation of the computing device 1000 such as operating systems, applications, programs, libraries, and drivers. It should be appreciated that the memory 1006 may store data that is manipulated by the operating logic 1008 of processing device 1002, such as, for example, data representative of signals received from and/or sent to the input/output device 1004 in addition to or in lieu of storing programming instructions defining operating logic 1008. As illustrated, the memory 1006 may be included with the processing device 1002 and/or coupled to the processing device 1002 depending on the particular embodiment. For example, in some embodiments, the processing device 1002, the memory 1006, and/or other components of the computing device 1000 may form a portion of a system-on-a-chip (SoC) and be incorporated on a single integrated circuit chip.

In some embodiments, various components of the computing device 1000 (e.g., the processing device 1002 and the memory 1006) may be communicatively coupled via an input/output subsystem, which may be embodied as circuitry and/or components to facilitate input/output operations with the processing device 1002, the memory 1006, and other components of the computing device 1000. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1000 may include other or additional components, such as those commonly found in a typical computing device (e.g., various input/output devices and/or other components), in other embodiments. It should be further appreciated that one or more of the components of the computing device 1000 described herein may be distributed across multiple computing devices. In other words, the techniques described herein may be employed by a computing system that includes one or more computing devices. Additionally, although only a single processing device 1002, I/O device 1004, and memory 1006 are illustratively shown in FIG. 18, it should be appreciated that a particular computing device 1000 may include multiple processing devices 1002, I/O devices 1004, and/or memories 1006 in other embodiments. Further, in some embodiments, more than one external device 1010 may be in communication with the computing device 1000.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device assembly configured for mounting to a door having an egress side and a non-egress side opposite the egress side, the exit device assembly comprising:

a trim configured for mounting to the non-egress side of the door, the trim comprising a lift finger and a manual actuator operable to drive the lift finger in an actuating direction; and a pushbar assembly configured for mounting to the egress side of the door, the pushbar assembly comprising a channel member, a header case positioned at an end of the channel member, a latch control assembly positioned in the header case, and a drive assembly including a pushbar operable to drive the latch control assembly between a deactuating state and an actuating state, wherein the lift finger is engaged with the latch control assembly such that movement of the lift finger in the actuating direction drives the latch control assembly from the deactuating state to the actuating state;

wherein the pushbar assembly further comprises a trim lock assembly mounted to the header case, the trim lock assembly comprising:

a blocking member comprising a blocking surface, wherein the blocking member is positioned within the header case and rotatable between a blocking position in which the blocking surface engages the lift finger such that the blocking member blocks actuating movement of the lift finger, and an unblocking position in which the blocking surface is disengaged from the lift finger such that the blocking member does not block actuating movement of the lift finger; and a lock actuator rotatably mounted to the header case and rotatable about a rotational axis to correspondingly rotate the blocking member about the rotational axis between the blocking position and the unblocking position.

2. The exit device assembly of claim 1, further comprising a latch mechanism having a deactuated state in which the latch mechanism is operable to retain the door in a closed position and an actuated state in which the latch mechanism is configured to permit opening of the door; and wherein the latch mechanism is operably connected with the latch control assembly such that movement of the latch control assembly from the deactuating state to the actuating state drives the latch mechanism from the deactuated state to the actuated state.

3. The exit device assembly of claim 1, wherein the lock actuator is a mechanical lock actuator.

4. The exit device assembly of claim 1, wherein the trim lock device further comprises a viewing window and an indicator comprising a locked indicium and an unlocked indicium;

wherein, with the blocking member in the blocking position, the locked indicium is aligned with the viewing window; and wherein, with the blocking member in the unblocking position, the unlocked indicium is aligned with the viewing window.

5. The exit device assembly of claim 1, wherein the lock actuator comprises a tail piece received in an opening of the blocking member, and wherein rotation of the tailpiece about the rotational axis correspondingly rotates the blocking member about the rotational axis between the blocking position and the unblocking position.

6. The exit device assembly of claim 1, wherein the blocking member rotates by about 90° between the blocking position and the unblocking position.

7. The exit device assembly of claim 1, wherein the blocking member comprises an indicator, wherein rotation of the blocking member between the blocking position and the unblocking position transitions the indicator between a first state in which the indicator displays a first indicium and a second state in which the indicator does not display the first indicium.

8. The exit device assembly of claim 1, wherein the blocking member comprises a first projection and a second projection spaced from the first projection;

wherein the first projection blocks actuating movement of the lift finger when the blocking member is in a first blocking position; and wherein the second projection blocks actuating movement of the lift finger when the blocking member is in a second blocking position.

9. A pushbar assembly configured to be mounted to an egress side of a door opposite a trim mounted to a non-egress side of the door, the trim comprising a lift finger, the pushbar assembly comprising:

a channel member;

a pushbar having a projected position in which the pushbar projects from the channel member and a depressed position in which the pushbar is at least partially received in the channel member;

a header case positioned adjacent an end of the channel member; and a trim lock device mounted to the header case, the trim lock device comprising:

a blocking member comprising a projection, wherein the blocking member is rotatably mounted within the header case for rotation between a blocking position in which the projection blocks actuating movement of the lift finger and an unblocking position in which the blocking member does not block actuating movement of the lift finger; and a lock actuator mounted to the header case and rotatable about a rotational axis to rotate the blocking member about the rotational axis between the blocking position and the unblocking position.

10. The pushbar assembly of claim 9, further comprising:

an indicator operably connected with the blocking member, wherein rotation of the blocking member between the blocking position and the unblocking position transitions the indicator between a first state in which the indicator displays a first indicium via a viewing window and a second state in which the indicator does not display the first indicium.

11. The pushbar assembly of claim 10, wherein the first indicium comprises a locked indicium and is displayed via the viewing window when the blocking member is in the blocking position.

12. The pushbar assembly of claim 11, wherein the indicator further comprises an unlocked indicium that is displayed via the viewing window when the blocking member is in the unblocking position.

13. The pushbar assembly of claim 9, wherein the lock actuator is a mechanical lock actuator.

14. The pushbar assembly of claim 13, wherein the mechanical lock actuator comprises a thumbturn.

15. The pushbar assembly of claim 9, further comprising an adapter configured for mounting to an end portion of the lift finger;

wherein the blocking member in the blocking position prevents movement of the adapter in an actuating direction; and wherein the blocking member in the unblocking position does not prevent movement of the adapter in the actuating direction.

16. An exit device assembly including the pushbar assembly of claim 9, the exit device assembly further comprising the trim;

wherein the pushbar assembly further comprises a latch control assembly mounted in the header case, wherein the latch control assembly is operably connected with the pushbar such that the pushbar is operable to drive the latch control assembly between an actuating state and a deactuating state;

wherein the lift finger is engaged with the latch control assembly such that movement of the lift finger in an actuating direction drives the latch control assembly from the deactuating state to the actuating state; and wherein the blocking member in the blocking position prevents movement of the lift finger in the actuating direction.

17. The exit device assembly of claim 16, further comprising a latch mechanism operably connected with the latch control assembly such that movement of the latch control assembly from the deactuating position to the actuating position actuates the latch mechanism.

18. The exit device assembly of claim 17, wherein the pushbar assembly comprises the latch mechanism.

19. The exit device assembly of claim 17, wherein the latch control assembly includes an upper driver and a lower driver;

wherein the latch mechanism is positioned above the pushbar assembly and is operably coupled with the upper driver; and wherein the lift finger is engaged with the lower driver.

20. The pushbar assembly of claim 9, wherein the lock actuator comprises a tail piece received in an opening of the blocking member, and wherein rotation of the tailpiece about the rotational axis correspondingly rotates the blocking member about the rotational axis between the blocking position and the unblocking position.

21. The pushbar assembly of claim 9, wherein the blocking member rotates by about 90° between the blocking position and the unblocking position.

22. A system comprising the pushbar assembly of claim 9, wherein the system further comprises the trim; and wherein the pushbar assembly and the trim are mounted to opposite sides of the door.

23. A trim lock device configured to be mounted to an egress side of a door opposite a trim mounted to a non-egress side of the door, the trim comprising a lift finger, the trim lock device comprising:

a housing comprising a window;

a blocking member comprising:

a body mounted in the housing, the body having a first side and an opposite second side;

a projection projecting from the first side of the body; and an indicator positioned on the second side of the body;

wherein the blocking member is rotatably mounted to the housing for rotation between a blocking position in which the projection blocks actuating movement of the lift finger and an unblocking position in which the blocking member does not block actuating movement of the lift finger; and a lock actuator movably mounted to the housing and operable to rotate the blocking member between the blocking position and the unblocking position;

wherein rotation of the blocking member between the blocking position and the unblocking position transitions the indicator between a first state in which the indicator displays a first indicium via the window and a second state in which the indicator does not display the first indicium.

24. A system comprising the trim lock device of claim 23, wherein the system further comprises the trim; and wherein the trim lock device and the trim are mounted to opposite sides of the door.

25. A trim lock device configured to be mounted to an egress side of a door opposite a trim mounted to a non-egress side of the door, the trim comprising a lift finger, the trim lock device comprising:

a housing;

a blocking member comprising:

a first projection, and wherein the blocking member is rotatably mounted to the housing for rotation between a first blocking position in which the first projection blocks actuating movement of the lift finger and an unblocking position in which the blocking member does not block actuating movement of the lift finger; and a second projection, and wherein the blocking member has a second blocking position in which the second projection blocks actuating movement of the lift finger, wherein the second blocking position is different from the first blocking position; and a lock actuator operable to rotate the blocking member between the blocking position and the unblocking position.

26. A system comprising the trim lock device of claim 25, wherein the system further comprises the trim; and wherein the trim lock device and the trim are mounted to opposite sides of the door.

27. The trim lock device of claim 25, wherein the first projection and the second projection are positioned diametrically opposite one another.

28. A method of operating an exit device assembly comprising a trim mounted to a non-egress side of a door, a pushbar assembly mounted to an egress side of the door opposite the non-egress side, a trim lock device mounted to the egress side of the door, and a latch mechanism operably connected with the pushbar assembly and the trim such that each of the pushbar assembly and the trim is at least selectively operable to actuate the latchbolt mechanism, wherein the trim lock device comprises a blocking member and a lock actuator that is accessible from the egress side of the door when the door is closed, the method comprising:

in response to rotation of the lock actuator about a rotational axis by a user on the egress side of the door when the door is closed, rotating the blocking member about the rotational axis between a blocking position and an unblocking position;

wherein the blocking member in the blocking position prevents actuating movement of a lift finger of the trim, thereby preventing the trim from actuating the latch mechanism; and wherein the blocking member in the unblocking position permits actuating movement of the lift finger, thereby permitting the trim to actuate the latch mechanism.

29. The method of claim 28, wherein rotation of the lock actuator comprises manually rotation of an actuating piece to thereby rotate the blocking member.

30. The method of claim 28, further comprising:

selectively displaying, via a viewing window of the trim lock device, a locked indicium when the blocking member is in the blocking position; and selectively displaying, via the viewing window, an unlocked indicium when the blocking member is in the unblocking position.

31. The method of claim 28, wherein the lock actuator comprises a tail piece received in an opening of the blocking member, and wherein rotation of the tailpiece about the rotational axis correspondingly rotates the blocking member about the rotational axis between the blocking position and the unblocking position.

32. The method of claim 28, wherein the blocking member rotates by about 90° between the blocking position and the unblocking position.

33. An exit device assembly configured for mounting to a door having an egress side and a non-egress side opposite the egress side, the exit device assembly comprising:

an electrified door lock device operable to selectively prevent opening of the door, the electrified door lock device including an electronic actuator operable to transition the electrified door lock device between a locked state and an unlocked state;

a pushbar assembly configured for mounting to the egress side of the door, the pushbar assembly comprising a drive assembly, the drive assembly including a pushbar operable to actuate the drive assembly to thereby permit opening of the door; and a mode selector installed to the pushbar assembly, the mode selector comprising:

an actuating mechanism configured to transition the mode selector between a locking state and an unlocking state;

control circuitry in communication with the electrified door lock device, wherein the control circuitry is configured to transmit a lock signal when the mode selector is in the locking state, and wherein the control circuitry is configured to transmit an unlock signal when the mode selector is in the unlocking state; and a mechanical indicator device having a lock-indicating position in which a locked indicium is visible via a window in the pushbar assembly when the mode selector is in the locking state, and wherein the mechanical indicator device has an unlock-indicating position in which an unlocked indicium is visible via the window when the mode selector is in the unlocking state;

wherein the electronic actuator is configured to transition the electrified door lock device from the unlocked state to the locked state in response to the lock signal;

wherein the electronic actuator is configured to transition the electrified door lock device from the locked state to the unlocked state in response to the unlock signal; and wherein the control circuitry further comprises a second electronic actuator configured to place the mechanical indicator device in the lock-indicating position when the mode selector is in the locking state and to place the mechanical indicator device in the unlock-indicating position when the mode selector is in the unlocking state.

34. An exit device assembly configured for mounting to a door having an egress side and a non-egress side opposite the egress side, the exit device assembly comprising:

an electrified door lock device operable to selectively prevent opening of the door, the electrified door lock device including an electronic actuator operable to transition the electrified door lock device between a locked state and an unlocked state;

a pushbar assembly configured for mounting to the egress side of the door, the pushbar assembly comprising a drive assembly, the drive assembly including a pushbar operable to actuate the drive assembly to thereby permit opening of the door; and a mode selector installed to the pushbar assembly, the mode selector comprising:

an actuating mechanism configured to transition the mode selector between a locking state and an unlocking state; and control circuitry in communication with the electrified door lock device, wherein the control circuitry is configured to transmit a lock signal when the mode selector is in the locking state, and wherein the control circuitry is configured to transmit an unlock signal when the mode selector is in the unlocking state;

wherein the electronic actuator is configured to transition the electrified door lock device from the unlocked state to the locked state in response to the lock signal;

wherein the electronic actuator is configured to transition the electrified door lock device from the locked state to the unlocked state in response to the unlock signal;

wherein the electrified door lock device has:

a default state;

a non-default state;

an electric locking mode in which the default state is the unlocked state and the non-default state is the locked state; and an electric unlocking mode in which the default state is the locked state and the non-default state is the unlocked state;

wherein one of the lock signal or the unlock signal comprises an electrical current, and wherein the electronic actuator is configured to transition the electrified door lock device from the default state to the non-default state in response to the electrical current;

wherein the other of the lock signal or the unlock signal comprises absence of the electrical current, and wherein the electronic actuator is configured to transition the electrified door lock device from the non-default state to the default state in response to absence of the electrical current; and wherein the electrified door lock device further comprises a switch operable to change the electrified door lock device between the electric locking mode and the electric unlocking mode.

35. A retrofit kit configured for use with an exit device assembly comprising a pushbar assembly installed to a first side of a door, the retrofit kit comprising:

a retrofit cover plate configured to replace an existing cover plate of the pushbar assembly, the retrofit cover plate comprising a window; and a mode selector mounted to the retrofit cover plate, the mode selector comprising:

an actuating mechanism operable to transition a locking/unlocking state of the mode selector between a locking state and an unlocking state;

mode selector control circuitry configured to transmit a lock/unlock signal corresponding to the locking/unlocking state of the mode selector; and an indicator device aligned with the window, the indicator device configured to display locked/unlocked indicia corresponding to the locking/unlocking state of the mode selector;

wherein the actuating mechanism comprises a mechanical actuating mechanism;

wherein the mode selector control circuitry comprises a position sensor configured to sense a locking/unlocking position of the mechanical actuating mechanism; and wherein the mode selector control circuitry is configured to transmit the lock/unlock signal based upon the locking/unlocking position of the mechanical actuating mechanism.

36. A method of operating an exit device assembly comprising an electrified door lock device operable to selectively prevent opening of a door via a latch mechanism, a pushbar assembly mounted to an egress side of the door and operable to actuate the latch mechanism to permit opening of the door, and a trim installed to a non-egress side of the door and comprising a manual actuator selectively operable to actuate the latch mechanism, the method comprising:

receiving, via an actuating mechanism of a mode selector, an actuating input, wherein the actuating input transitions a locking/unlocking state of the mode selector from a prior locking/unlocking state to a current locking/unlocking state;

in response to the actuating input, causing an indicator device of the mode selector to display locked/unlocked indicia corresponding to the current locking/unlocking state;

in response to the actuating input, transmitting, by control circuitry of the mode selector and to an electronic actuator of the electrified door lock device, a lock/unlock signal corresponding to the current locking/unlocking state; and in response to the lock/unlock signal, operating the electronic actuator to adjust a locked/unlocked state of the electrified door lock device to match to the current locking/unlocking state of the mode selector;

by the electrified door lock device, preventing the manual actuator from actuating the latch mechanism when the locked/unlocked state of the electrified door lock device is a locked state; and by the electrified door lock device, permitting the manual actuator to actuate the latch mechanism when the locked/unlocked state of the electrified door lock device is an unlocked state.

* * * * *